(12) United States Patent
Moyer et al.

(10) Patent No.: US 11,845,157 B2
(45) Date of Patent: Dec. 19, 2023

(54) CHEMICAL MECHANICAL PLANARIZATION PADS VIA VAT-BASED PRODUCTION

(71) Applicant: Cabot Microelectronics Corporation, Aurora, IL (US)

(72) Inventors: Eric S. Moyer, Aurora, IL (US); Lin Fu, Rancho Palos Verdes, CA (US); William Michael Spitzig, Lake Oswego, OR (US); Chen-Chih Tsai, Naperville, IL (US); Ping Huang, Beaverton, OR (US); Justin Stewart, Aurora, IL (US); Carlos Barros, West Chicago, IL (US)

(73) Assignee: CMC MATERIALS, INC., Aurora, IL (US)

(*) Notice: Subject to any disclaimer, the term of this patent is extended or adjusted under 35 U.S.C. 154(b) by 517 days.

(21) Appl. No.: 16/868,965

(22) Filed: May 7, 2020

(65) Prior Publication Data

US 2020/0353586 A1 Nov. 12, 2020

Related U.S. Application Data

(60) Provisional application No. 62/926,192, filed on Oct. 25, 2019, provisional application No. 62/844,196, filed on May 7, 2019.

(51) Int. Cl.
*B24B 37/26* (2012.01)
*B24B 37/22* (2012.01)
(Continued)

(52) U.S. Cl.
CPC .............. *B24B 37/26* (2013.01); *B24B 37/22* (2013.01); *B24B 37/24* (2013.01); *B33Y 10/00* (2014.12);
(Continued)

(58) Field of Classification Search
CPC ......... B24B 37/26; B24B 37/22; B24B 37/24; B33Y 10/00; B33Y 30/00; B33Y 80/00; C08L 75/04
See application file for complete search history.

(56) References Cited

U.S. PATENT DOCUMENTS 9,873,180 B2 1/2018 Bajaj et al.
2004/0055223 A1 3/2004 Ono et al.
(Continued)

FOREIGN PATENT DOCUMENTS

TW 201900426 A 1/2019

OTHER PUBLICATIONS

Korean Intellectual Property Office Acting as ISA, International Search Report and Written Opinion of he International Searching Authority issued in connection with Application No. PCT/US2020/031831 dated Aug. 21, 2020.
(Continued)

*Primary Examiner* — Michael M. Robinson

(57) ABSTRACT

A chemical mechanical polishing (CMP) pad includes a polishing portion formed using a vat-based additive manufacturing process. The polishing portion includes a polymer material with a first elastic modulus. In some embodiments the polishing portion is disposed on the backing portion. The backing portion may have a second elastic modulus. The second elastic modulus may be less than the first elastic modulus.

8 Claims, 17 Drawing Sheets

(51) Int. Cl.
　　　*B24B 37/24* 　　(2012.01)
　　　*B33Y 80/00* 　　(2015.01)
　　　*B33Y 10/00* 　　(2015.01)
　　　*B33Y 30/00* 　　(2015.01)
　　　*C08L 75/04* 　　(2006.01)

(52) U.S. Cl.
　　　CPC ............... *B33Y 30/00* (2014.12); *B33Y 80/00* (2014.12); *C08L 75/04* (2013.01)

(56) References Cited

U.S. PATENT DOCUMENTS

| | | | |
|---|---|---|---|
| 2012/0302148 A1* | 11/2012 | Bajaj | B29C 39/123 |
| | | | 264/45.3 |
| 2016/0107288 A1* | 4/2016 | Orilall | B24B 37/22 |
| | | | 451/529 |
| 2016/0354896 A1 | 12/2016 | Lewis et al. | |
| 2017/0203408 A1* | 7/2017 | Ganapathiappan | B24B 37/24 |
| 2017/0259499 A1* | 9/2017 | Ng | B24B 37/22 |

OTHER PUBLICATIONS

Korean Intellectual Property Office Acting as ISA, International Search Report and Written Opinion of the International Searching Authority issued in connection with Application No. PCT/US2020/031831 dated Aug. 21, 2020.

* cited by examiner

US 11,845,157 B2

CHEMICAL MECHANICAL PLANARIZATION PADS VIA VAT-BASED PRODUCTION

CROSS REFERENCE TO RELATED APPLICATIONS

This application claims priority under 35 U.S.C. § 119 of U.S. Provisional Application Ser. No. 62/844,196, filed May 7, 2019, entitled, "Chemical mechanical planarization pads via continuous liquid interface production" and U.S. Provisional Application Ser. No. 62/926,192, filed Oct. 25, 2019, entitled, "Chemical mechanical planarization pads with constant groove volume," each of which is hereby incorporated by reference.

TECHNICAL FIELD

This disclosure generally relates to polishing pads used in chemical mechanical polishing, and more specifically to chemical mechanical polishing pads prepared via vat-based production.

BACKGROUND

An integrated circuit is typically formed on a substrate by the sequential deposition of conductive, semi-conductive, and/or insulative layers on a silicon wafer. A variety of fabrication processes require planarization of at least one of these layers on the substrate. For example, for certain applications (e.g., polishing of a metal layer to form vias, plugs, and lines in the trenches of a patterned layer), an overlying layer is planarized until the top surface of a patterned layer is exposed. In other applications (e.g., planarization of a dielectric layer for photolithography), an overlying layer is polished until a desired thickness remains over the underlying layer. Chemical-mechanical planarization (CMP) is one method of planarization. This planarization method typically involves a substrate being mounted on a carrier head. The exposed surface of the substrate is typically placed against a polishing pad on a rotating platen. The carrier head provides a controllable load (e.g., a downward force) on the substrate to push it against the rotating polishing pad. A polishing liquid, such as slurry with abrasive particles, can also be disposed on the surface of the polishing pad during polishing.

SUMMARY

One objective of a chemical mechanical planarization process is to achieve a high polishing uniformity. If different areas on the substrate are polished at different rates, then it is possible for some areas of the substrate to have too much material removed ("overpolishing") or too little material removed ("underpolishing"). Conventional polishing pads, including standard pads and fixed-abrasive pads, can suffer from these problems. A standard pad may have a polyurethane polishing layer with a roughened surface and may also include a compressible backing layer. A fixed abrasive pad has abrasive particles held in a containment media and is typically supported on an incompressible backing layer.

These conventional polishing pads are typically prepared by molding, casting or sintering polyurethane materials. Molded polishing pads must be prepared one at a time (e.g., by injection molding). For casting polishing pads, a liquid precursor is cast and cured into a "cake," which is subsequently sliced into individual pad sections. These pad sections must then be machined to a final thickness. Polishing pads prepared using conventional extrusion-based processes generally lack desirable properties for CMP (e.g., are too brittle for effective CMP). This disclosure provides polishing pads, and methods of their manufacture, that facilitate improved polishing uniformity to meet the increasingly challenging polishing requirements of new integrated circuit designs.

In one embodiment, a chemical mechanical polishing (CMP) pad includes a polishing portion formed using a vat-based additive manufacturing process. The polishing portion includes a polymer material with a first elastic modulus. In some embodiments, the polishing portion includes a polishing surface. In some embodiments, the polishing surface includes at least one of grooves, pores, or a microstructure. In some embodiments, a density of the polishing portion is in a range from 0.3 to 0.9 grams per centimeter cubed ($g/cm^3$). In some embodiments, the polishing portion includes polyurethane. In some embodiments the polishing portion is disposed on a backing portion. In some embodiments, the backing portion has a second elastic modulus. In some embodiments, the second elastic modulus is less than the first elastic modulus. In some embodiments, the backing portion is formed using the vat-based manufacturing process. In some embodiments, the backing portion includes at least one of a nonporous layer, a porous layer, or a lattice structure. In some embodiments, the polishing portion and the backing portion may be attached without the use of an adhesive.

In another embodiment, a chemical mechanical polishing pad includes a surface portion of a first material. The surface portion includes a plurality of grooves. A first portion of the grooves are exposed grooves located at a surface of the chemical mechanical polishing pad. A second portion of the grooves are buried grooves embedded below the surface of the chemical mechanical polishing pad, such that, during use of the chemical mechanical polishing pad, one or more of the buried grooves are exposed at the surface.

BRIEF DESCRIPTION OF FIGURES

To assist in understanding the present disclosure, reference is now made to the following description taken in conjunction with the accompanying drawings, in which.

DETAILED DESCRIPTION

It should be understood at the outset that, although example implementations of embodiments of the disclosure are illustrated below, the present disclosure may be implemented using any number of techniques, whether currently known or not. The present disclosure should in no way be limited to the example implementations, drawings, and techniques illustrated below. Additionally, the drawings are not necessarily drawn to scale.

The present disclosure recognizes that conventional processes for manufacturing CMP polishing pads, including pads prepared via extrusion-based printing, (i) suffer from low throughput and low reproducibility; (ii) cannot be used to prepare pads with complex, multi-scale three-dimensional porous structures; and (iii) are often incompatible with materials which have desired chemical and mechanical properties for CMP. Moreover, in order to provide uniform polishing, a polishing pad should form a uniform contact with the substrate being polished, such that uniform pressure can be applied across the substrate surface. Variation in pad thickness can result in non-uniform pressure across the substrate surface. Even small variations in thickness may lead to variations in the applied pressure, and hence non-uniform removal during polishing as well as increased defects (e.g., micro-scratches) on the substrate surface. The polishing pads described herein provide more uniform polishing than is possible using conventional polishing pads.

The present disclosure further recognizes that a polishing pad with improved chemical and mechanical properties may be efficiently produced using a vat-based additive manufacturing process. Vat-based additive manufacturing generally involves the sequential photopolymerization of thin layers of a volume of a liquid precursor to form an object. The liquid precursor is contained in a vessel (e.g. vat). The vat may be any suitable container capable of holding a sufficient amount of the liquid precursor to supply the build region. For example, a thin film of a liquid precursor (e.g., a liquid UV sensitive prepolymer, e.g., a photo-active resin) may be exposed to spatially patterned UV irradiation. Regions (e.g. build region) of the precursor that are exposed to UV irradiation are polymerized to form a thin solid layer that has a structure that is determined by the pattern of the UV irradiation. Each layer is about 25-100 micrometers thick and is deposited on the previous layers which are adhered to a movable build platform. The build platform is moved such that the polishing pad layer is continuously formed using patterns of UV irradiation, resulting in the precise layer-by-layer formation of a polymer structure with a desired design and dimensions. Examples of such processes include continuous liquid interface production (CLIP) and high-area rapid printing (HARP).

Chemical Mechanical Planarization System

Figure 1:
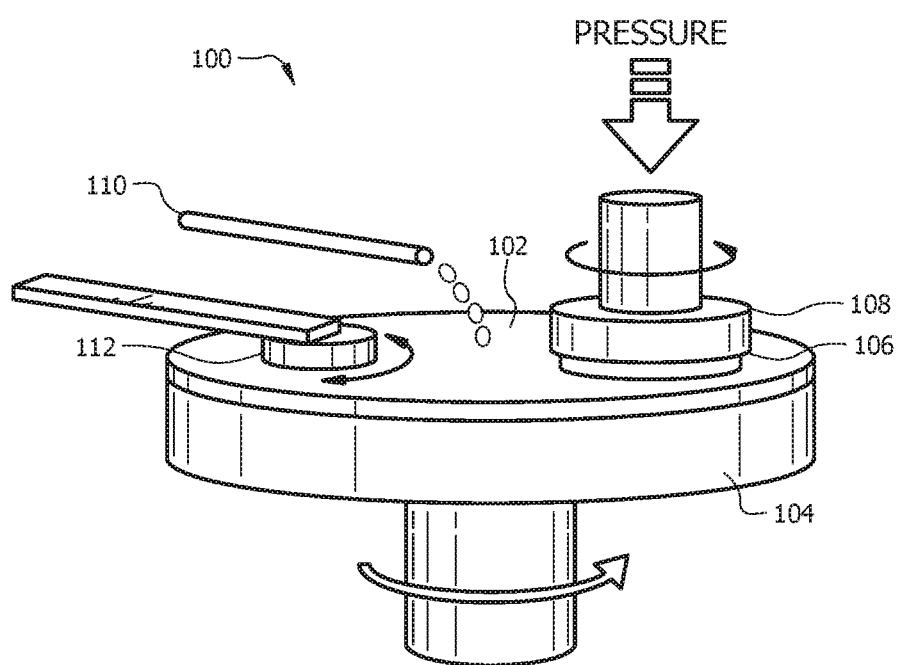
FIG. 1 is a diagram of an example system for chemical mechanical planarization (CMP)

FIG. 1 illustrates a system 100 for performing chemical mechanical planarization. System 100 includes a CMP pad 102 (also referred to as a "polishing pad") which is placed on or attached to a platen 104. For example, an adhesive layer (not shown) may be used to attach the polishing pad to the platen 104. The platen 104 can generally be rotated during chemical mechanical planarization. A wafer 106 (e.g., a silicon wafer with or without conductive, semi-conductive, and/or insulative layers, as described above) is attached to a head 108 of a rotatable chuck. The wafer 106 may be attached using vacuum and/or a reversible adhesive (e.g., an adhesive that holds the wafer 106 in place during chemical mechanical planarization but allows the wafer 106 to be removed from the head 108 after chemical mechanical planarization). As illustrated in FIG. 1, a pressure may be applied to the wafer 106 during chemical mechanical planarization (e.g., to facilitate contact between the surface of the wafer 106 and the polishing pad 102).

Example polishing pads 102 are illustrated in FIGS. 2A-10B and described in greater detail with respect to these figures below. The polishing pad 102 generally has a circular or approximately cylindrical shape (i.e., with a top surface, a bottom surface, and a curved edge). The polishing pad 102 may comprise polyurethane, such as a flexible polyurethane or a rigid polyurethane. Examples of compositions used to prepare example polishing pads 102 are described in greater detail below. In some embodiments, the compositions include one or more porogens. The porogens may be particles (e.g., microspheres) which expand in volume when heated. The porogens may cause the formation of pores in the polishing pad 102, which may improve pad performance, as described below with respect to FIG. 3 and TABLE 1. Polishing pad 102 may have any appropriate thickness and any appropriate diameter (e.g., to be employed with a CMP system such as system 100, described above). For instance, the thickness of a polishing pad 102 may range from about 0.5 millimeters to greater than 5 centimeters. In some embodiments, the thickness of the polishing pad may be in a range from 1 millimeter to 5 millimeters. Vat-based manufacturing processes may be used to prepare polishing pads 102 that are thick, and these thick polishing pads 102 can include more complex structures (e.g., a larger number of layers of buried grooves) than was possible using previous technology. Polishing pad diameter is generally selected to match or be just smaller than, the diameter of the platen 104 of the polishing system 100 used. The polishing pad 102 generally has a uniform thickness (e.g., a thickness that varies by no more than 50%, 25%, 20%, 10%, 5%, or less across the radial extent of the polishing pad).

Figure 2A:
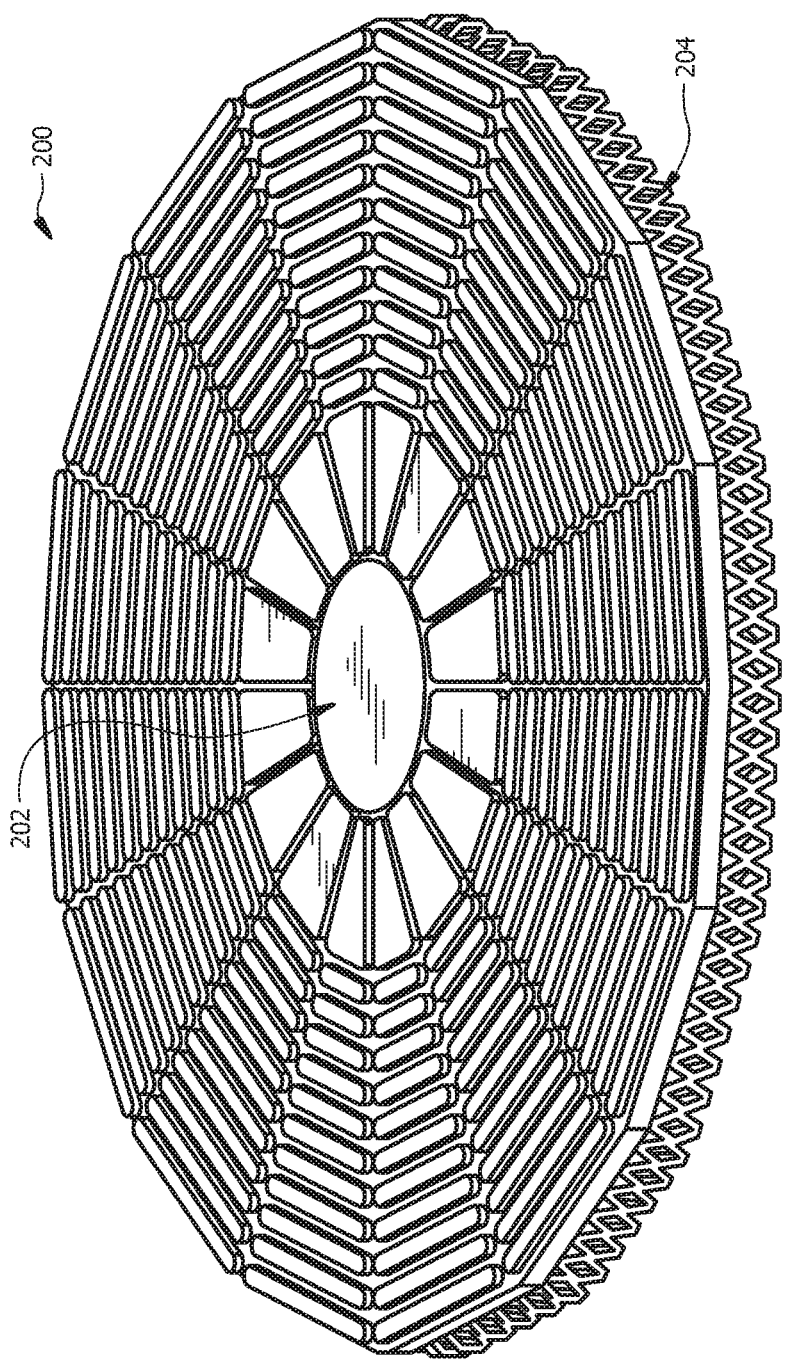
FIGS. 2A-2C are diagrams of example polishing pads, according to illustrative embodiments of the present disclosure.
Figure 2B:
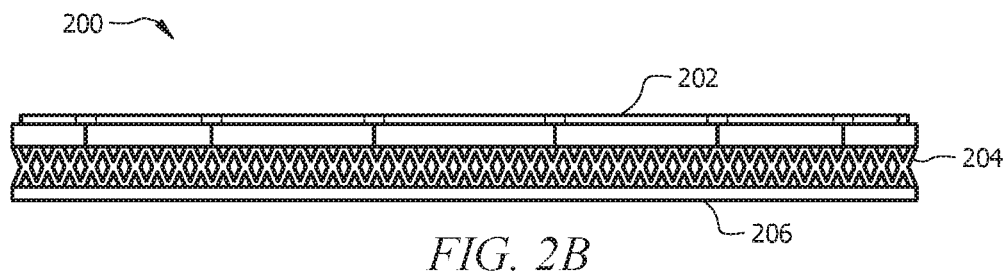
Figure 2C:
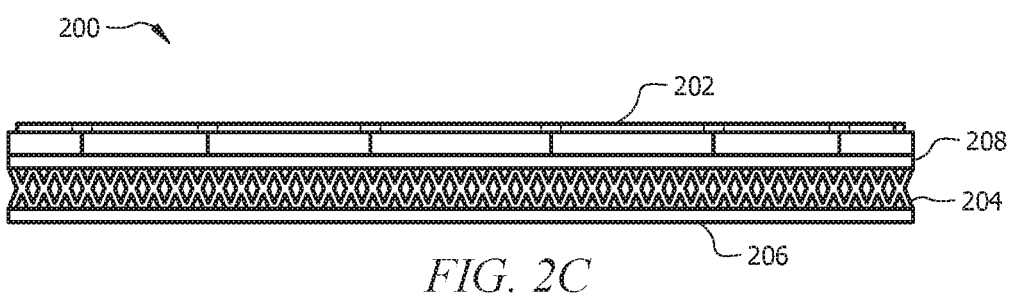
Figure 3:
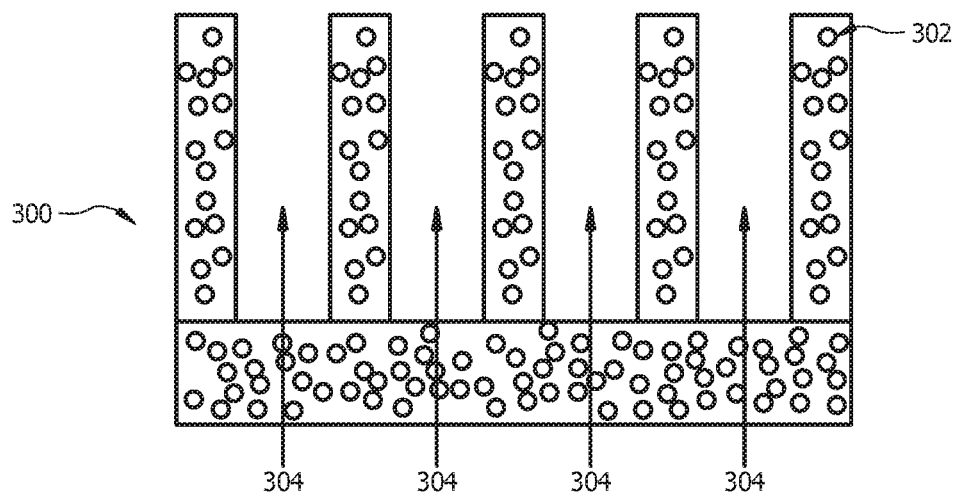
FIG. 3 is a diagram of an example polishing surface of a polishing pad, according to an illustrative embodiment.
Figure 4:
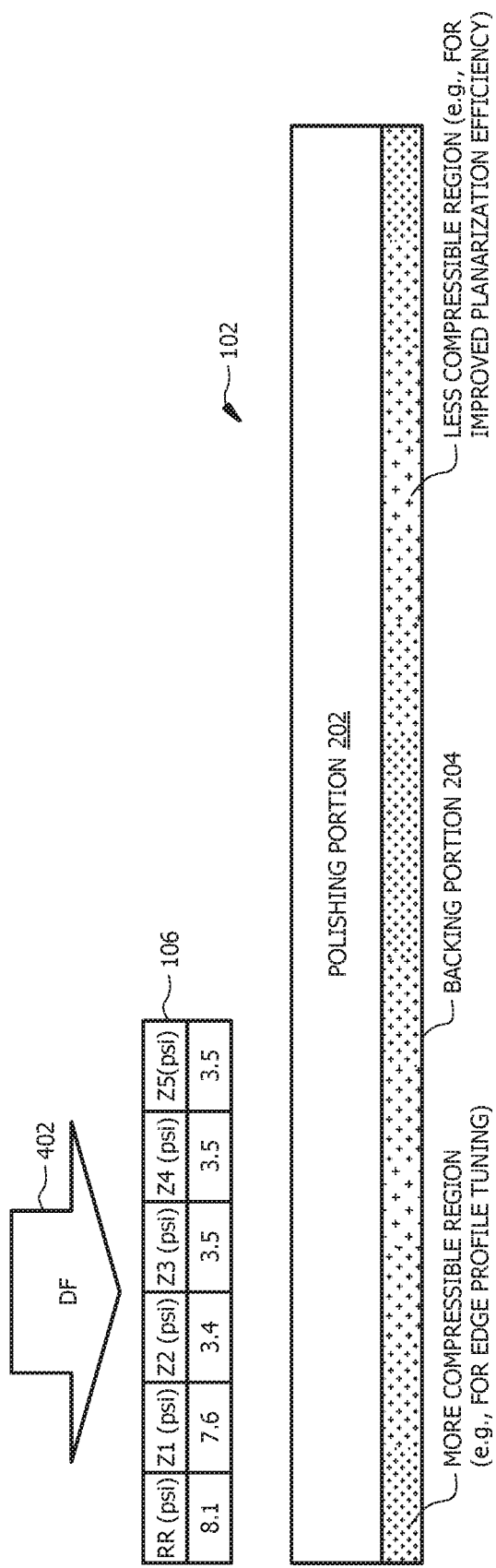
FIG. 4 is a diagram of an example polishing pad, according to an illustrative embodiment.

The vat-based manufacturing processes described in this disclosure facilitate the preparation of a pad 102 with improved properties for chemical mechanical planarization. Examples of the polishing pad 102 are described in greater detail below with respect to FIGS. 2A-10B. FIGS. 2A-2C describe the structure of example polishing pads 102 with a polishing portion and an underlying backing portion. FIG. 3 illustrates a portion of a polishing pad 102 with a porous structure. The pad 102 may have a compressibility (e.g., elastic modulus) that varies along the radius of the pad to provide improved planarization, as described in greater detail below with respect to FIG. 4. FIG. 4. The presence of buried grooves and/or channels provides several benefits such as improved planarization uniformity, extended pad lifetime, as described in greater detail below with respect to FIGS. 5A to 10B.

A slurry 110 may be provided on the surface of the polishing pad 102 before and/or during chemical mechanical planarization. The slurry 110 may be any appropriate slurry for planarization of the wafer type and/or layer material to be planarized (e.g., to remove a silicon oxide layer from the surface of the wafer 106). The slurry 110 generally includes a fluid and abrasive and/or chemically reactive particles. Any appropriate slurry 110 may be used. For example, the slurry 110 may react with one or more materials being removed from a surface being planarized. Certain embodiments of the polishing pads described in this disclosure provide for the removal of expended slurry 110 (i.e., slurry 110 in which active materials have been largely consumed) away from the surface being planarized and/or for the replenishment of fresh slurry 110 near the surface being planarized (see, e.g., FIGS. 5A-5B, 6A-6D, and 8E).

A conditioner 112 is a device which is configured to condition the surface of the polishing pad 102. The conditioner 112 generally contacts the surface of the polishing pad 102 and removes a portion of the top layer of the polishing pad 102 to improve its performance during chemical mechanical planarization. For example, the conditioner 112 may roughen the surface of the polishing pad 102. If the polishing pad 102 is one of the unique polishing pads described in this disclosure with buried grooves, the conditioner 112 may expose buried grooves which are embedded within the polishing pad 102. As described further below, the unique polishing pads described in this disclosure may reduce or remove the need to use conditioner 112 because the lifetime of the polishing pads described in this disclosure are extended compared to those of conventional polishing pads.

Example Polishing Pads

FIGS. 2A-2C illustrate exemplary polishing pads 200 of the present disclosure. Polishing pads 200 may be used as polishing pad 102 of FIG. 1. The polishing pad 200 of FIGS. 2A and 2B includes a polishing portion 202 disposed on a backing portion 204. In this illustrative example, the backing portion 204 is disposed directly on an adhesive 206, which is used to adhere the pad to a rotatable platen 104 for polishing. In general, the backing portion 204 facilitates compression of the polishing pad 200 during its use. This is achieved by an elastic modulus of the polishing portion 202 being different (generally larger) than that of the backing portion 204. Compressibility can effectively be expressed in terms of an elastic modulus of each portion, where an increased elastic modulus corresponds to a decreased compressibility.

In general, the backing portion 204 can be provided with a different compressibility (or effective elastic modulus) than the polishing portion 202 by one or more of: (1) using a different extent of curing during manufacturing (e.g., a different intensity of UV radiation), (2) manufacturing the polishing portion 202 with a different structure (e.g., a lattice structure as shown in FIGS. 2A-C, a honeycomb structure, or a structure comprising regularly spaced cylindrical pores) than that of the polishing portion, (3) using a different photo-crosslinked polymer for preparing the backing portion 204 than for preparing the polishing portion 202, and (4) using different additives (or a different amount of additives) during preparation of the backing portion 204 than during preparation of the polishing portion 202. For instance, the backing portion 204 shown in FIG. 2A has a lattice structure for increased compressibility. The geometry of this lattice can be tuned to achieve a desired compressibility of the backing portion 204.

The polishing pads 200 generally comprise polyurethane, such as a flexible polyurethane or a rigid polyurethane. The pads generally have a density of between 0.3 and 0.9 g/cm$^3$. In certain embodiments, the density of the pad 200 is between 0.5 and 0.9 g/cm$^3$. In certain embodiments, the pads have a preferred density of about 0.7 g/cm$^3$. In some embodiments, an appropriate porogen may be included with the precursor at the time the pads 200 are manufactured in order to achieve a desired (e.g., decreased) density.

The effective elastic modulus of the pad 200, which is determined by the elastic modulus of the polishing portion 202 and the backing portion 204, is generally in a range from about 400 to 600 MPa. As described above, the effective elastic modulus (e.g., or the compressibility) of the backing portion 204 is generally different than that of the polishing portion 202. In general, the backing portion 204 is more compressible (e.g., has a lower elastic modulus) than the polishing portion 202. The elastic modulus of the backing portion 204 may be in a range from about 1 to about 200 MPa. The elastic modulus of the polishing portion 202 may be in a range from about 400 to about 1200 MPa.

As shown in FIG. 2A (top view), the pad generally has a circular or approximately cylindrical shape. The thickness of the pad 200 may be in a range from about 50 mils to about 400 mils (about 1.27 millimeters to about 10.16 millimeters), and the diameter from about 20 to 30 inches (about 500 millimeters to about 760 millimeters). The polishing portion 202 may have a thickness of about 50 to 155 mils. The backing portion 204 may have a thickness of about 15 mil to 150 mils (1 mil=1 thousandths of an inch). It should be understood that the polishing pad 200 could be any other thickness or diameter as appropriate for a given polishing application.

The polishing pads 200 generally have a uniform thickness. A uniform thickness is defined as a thickness that varies by no more than 50%, 25%, 20%, 10%, 5%, or less across the radial extent of the pad. In other words, the thickness measured near the center of the pad is substantially the same as the thickness near the edge of the pad. Compared to pads produced by extrusion, foaming, casting, molding or extrusion-based 3D printing, the polishing pads of the present disclosure have superior thickness uniformity.

As shown in FIG. 2A (top view), the surface of the polishing portion 202 may include patterned grooves. The grooves generally aid in slurry distribution and waste removal. The illustrative example of FIG. 2A (top view) shows grooves with a "spiderweb" design. However, any other appropriate groove design is contemplated by the present disclosure. For example, the grooves may have a concentric, a concentric and radial, or a hexagonal close-packed design. In general, the grooves are produced by the processes described herein (e.g., a described with respect to FIG. 11). However, grooves may also or alternatively be machined after the polishing pad is produced according to the present disclosure.

In certain embodiments, such as that shown in FIGS. 2A and 2B, the polishing pad 200 comprises a continuous, single-body structure, where the polishing portion 202 and backing portion 204 are a continuous structure. Such a continuous single-body structure is in contrast to conventional multilayered polishing pads, which typically have a top sheet that is adhered to a subpad using an intervening adhesive, or bonding layer, disposed between the top sheet and subpad. Such embodiments obviate the need for this adhesive and thereby provide various advantages over conventional technology. For example, in common polishing processes, slurries are used that contain compounds that may react with and weaken the adhesive layer, resulting in possible damage to and failure of the conventional polishing pads. Additionally, polishing pads can be exposed to high temperatures because of heat generated during certain polishing steps, and these high temperatures can weaken the adhesive used to connect the top sheet to the subpad of conventional polishing pads. This can result in detachment of the pad layers and subsequent pad failure. The continuous single-body polishing pad 200 shown in FIGS. 2A and 2B solves problems of conventional polishing pads by eliminating the need for an intermediate adhesive layer between the polishing portion and the backing portion.

In certain CMP processes, it may be advantageous for the polishing portion 202 and backing portion 204 to comprise different or dissimilar materials. For example, it may be beneficial for the polishing portion 202 to comprise a polyurethane material, while the backing portion 204 comprises a different material such as a polyurethane material with a different compressibility, a polystyrene, or a metal. In some embodiments, the backing portion 204 may be prepared in a first vat via a first vat-based manufacturing process (e.g., in a first additive manufacturing device), and the completed backing portion 204 may be transferred to a second vat (see step 1116 of FIG. 11) where the polishing portion 202 is prepared (e.g., in a second additive manufacturing device). Such a sequential, two-vat process facilitates efficient production of CMP pad 200.

Referring now to the side view shown in FIG. 2B, the backing portion 204 of the polishing pad may be disposed on (e.g., prepared directly on) a layer of platen adhesive 206. The platen adhesive 206 may be, for example, a thin adhesive layer (e.g., a layer of pressure-sensitive adhesive) that is operable to adhere the rotating platen of a CMP apparatus. Other adhesives or adhesion processes may also or alternatively be used as appropriate. In certain embodiments, the polishing pad 200 is manufactured directly on the platen adhesive layer 206. For example, the manufacturing process described with respect to FIG. 11 below may be performed on a layer of platen adhesive 206, which effectively functions as the build platform. An advantage of this embodiment is that the pad 200 may be ready to use immediately after the pad 200 is manufactured. Thus, difficult, time-consuming, and costly processes for attaching the pad 200 to the platen adhesive 206 are avoided.

FIG. 2C illustrates a side view of another embodiment of a polishing pad 200 according to the present disclosure. In this embodiment, the polishing portion 202, prepared using the inventive techniques and processes described herein, is adhered to a backing portion using an adhesive 208 (e.g., as described above). In other words, in this embodiment, the polishing portion 202 and backing portion 204 are not a continuous single-body structure. Instead, the polishing portion 202 is secured to the backing portion 204 by a thin bonding layer 208 (e.g., a layer of pressure-sensitive adhesive or polyurethane plastic layer). Other adhesives may also or alternatively be used as appropriate. For example, the adhesive may be a hot-melt adhesive, or the polishing portion and backing portion may be connected by laminating a thin layer of a thermoplastic material between the portions 202, 204. The backing portion 204 may be prepared by the processes described herein, prepared by a separate process, or otherwise appropriately obtained.

In certain implementations of the embodiment shown in FIG. 2C, the backing portion 204 is fabricated using the processes described herein. However, in other implementations, a conventional additive manufacturing process is used to prepare the backing layer such as extrusion-based 3D printing. Thus, the backing portion 204 may be used as a build support for manufacture of the polishing portion 202. In other embodiments, the polishing portion 202 may include a material that adheres to the backing portion 204 such that an intervening adhesive layer 208 is not required (as shown in FIGS. 2A and 2B). If the polishing portion 202 comprises a polymeric material that does not adhere to the backing portion 204, an intermediate layer may be disposed on the backing portion 204 to facilitate attachment of the polishing portion 202 without requiring an intervening adhesive layer 208.

In various embodiments, the pad 200 includes an aperture therein, such that an end-point detection element can be placed in the aperture. Any suitable end-point detection element may be used (e.g., any sensor to detect when a polishing process is complete). Various shapes and configurations for the end-point detection element can be designed using the unique pad manufacturing processes described herein. By forming the aperture using the processes of the present disclosure (e.g., as described with respect to FIG. 11 below), less material is wasted than when conventional pad manufacturing processes are used, which typically require a section of the pad to be removed and discarded to form the aperture.

Porous Polishing Surface

FIG. 3 depicts a microscopic view of a polishing surface 300 of a polishing portion 202 that includes pores 302, 304 of different sizes, shapes, and/or orientations. As shown in FIG. 3, in some embodiments, the polishing surface 300 may include pores 302, 304 with a bimodal pore size distribution. In other words, a first set of pores 302 may have a mean particle size that is smaller than that of a second set of pores 304. For example, a first set of pores 302 may have a mean particle size of about 5 to about 200 microns, and a second set of pores 304 may have a mean pore diameter of about 50 to 500 microns. In this embodiment, the first set of pores 302 may be produced using a porogen (e.g., a porosity forming agent or "pore filler"), and the second set of pores 304 may be patterned using the vat-based manufacturing process (e.g., continuous liquid interphase production, e.g., as described with respect to FIG. 11). Alternatively, the first set of pores 302 and the second set of pores 304 may be generated using porogens that generate pores of different sizes (e.g., porogens with different diameters and/or that expand to different sizes during preparation of the polishing surface 300). One or more additional sets of pores (not shown for clarity and conciseness) may also be prepared using the processes described herein and/or one or more additional porogens.

Example porogens suitable for the polishing pads 102 described herein include spherical or nearly-spherical, hollow particles. The porogens may have a diameter of about 5 to about 500 microns. The porogens may be distributed evenly throughout the pad or located in one or more regions of the pad. In some embodiments, bimodally distributed pores are located only near the polishing surface 300 illustrated in FIG. 3. For example, smaller pores 302 may only be required near the polishing surface 300 where they increase the contact area between the polishing pad and a surface being polished. Additionally, the larger pores 304, which may also be located at or near the polishing surface 300, are believed to improve slurry 110 retention and transport, thereby increasing the contact area between the slurry 110 and substrate 106 for improved polishing (see FIG. 1 for reference). The precursor mixture used to prepare a polishing pad 102 may include porogens at a mass percentage of about 1% to about 30% (by weight). In certain embodiments, the precursor mixture used to prepare a polishing pad 102 includes 30% (by weight) of the porogen. In some embodiments, precursor mixture used to prepare a polishing pad 102 includes from 1% to 5% (by weight) of the porogen. In certain embodiments, the porogen has a similar density to that of the precursor material used to prepare the polishing pad, thereby facilitating even distribution of the porogen in each layer of the pad during its manufacture. Examples of porogens include Expancel DU powders such as 551 DU 40, 461 DU 20, 461 DU 40, 051 DU 40, 031 DU 40, and 053 DU 40.

In another embodiment, the polishing pad 102 comprises a plurality of elongated pores 304 having an aspect ratio of about 2:1 or greater. The elongated pores 304 are not the result of porogen incorporation but are rather formed from the vat-based manufacturing process. In this embodiment, about 10% or more of the pores 302, 304 have an aspect ratio of about 2:1 or greater (e.g., about 3:1 or greater, about 5:1 or greater, about 10:1 or greater, or about 20:1 or greater). Desirably, about 20% or more (e.g., about 30% or more, about 40% or more, or about 50% or more) of the pores 302, 304 have an aspect ratio of about 2:1 or greater (e.g., about 3:1 or greater, about 5:1 or greater, about 10:1 or greater, or about 20:1 or greater). Preferably, about 60% or more (e.g., about 70% or more, about 80% or more, or about 90% or more) of the pores 302, 304 have an aspect ratio of about 2:1 or greater (e.g., about 3:1 or greater, about 5:1 or greater, about 10:1 or greater, or about 20:1 or greater).

The elongated pores 304 may be oriented in a direction that is coplanar with the polishing surface 300 of the polishing pad 102 or perpendicular to the surface 300. When the elongated pores 304 are oriented in a direction that is perpendicular to the surface 300, the pores 304 may span the thickness of the polishing portion (e.g., portion 202 of FIGS. 2A-2C) of the pad 102, or some percentage of the thickness of the polishing portion. That is, the pores 304 may create an opening from the polishing surface 300 of the polishing portion to the back surface of the polishing portion.

In another embodiment, the pores 302, 304 may result in a polishing surface 300 with uniformly sized (and/or spaced) asperities. In various embodiments, a property (e.g., asperity size or density) may be considered uniform, if that property when measured in two or more similarly sized regions of the polishing pad differ by no more than 50%, 25%, 20%, 10%, 5%, or less. Asperities of uniform height (e.g., size) and density may be produced using the methods described herein to improve polishing performance. In conventional polishing pads, asperities are generated by conditioning the surface of the pad, typically by contacting the pad with a diamond conditioner. The asperity size distribution depends on both the properties of the pad and the conditioning process used. Thus, conventional pads typically have a wide (e.g., and non-uniform) distribution of asperity sizes. In some embodiments, similar asperities are prepared using a vat-based manufacturing process as described herein without necessarily requiring addition of a porogen.

Thus, the polishing pads 102 of the present disclosure can be designed to have a very uniform distribution of asperity size (e.g., height) because the asperities formed do not necessarily rely on conditioning steps like those required by polishing pads made by conventional methods. In some embodiments, the uniformly sized asperities of the polishing surfaces facilitate improved polishing, particularly for certain substrates. Moreover, the pads 102 of the present disclosure can be prepared with the same asperity characteristics between batches, facilitating improved pad-to-pad reproducibility. This is not possible for conventional pads produced by foaming, casting, or molding processes.

In certain embodiments, the pads 102 may include chemical additives (e.g., embedded or encapsulated within at least the polishing portion) for enhanced polishing performance. The additives may be any suitable material that would have an advantageous effect on the polishing of a given substrate 106. For example, one or more of dishing control agents, rate enhancing agents, or film forming agents may be encapsulated and integrated into the pad 102 using the processes described herein. As the pad wears during normal use, encapsulated additives are released and contact both the substrate 106 and polishing slurry 110. In this way, additional slurry components, which may otherwise be too reactive or unstable when added directly to the slurry 100, may be incorporated into the pad 102 itself. These pad-embedded slurry components would thus only be exposed to the slurry 100 for a brief time, reducing or eliminating unwanted reactions between the slurry components.

Spatial variation of Polishing Pad Compressibility

FIG. 4 illustrates a polishing pad 102 of the present disclosure being used to polish a wafer 106 held in a wafer holder by a retaining ring (e.g., attached to the head 108 of FIG. 1). As described herein, polishing properties can be tuned through spatial control of the compressibility (e.g., via the effective elastic modulus) of the backing portion 204 of the pad 102. Compressibility of the backing portion 204 can be controlled, for example, by (1) controlling the extent of curing during manufacturing (e.g., a different intensity of UV radiation), (2) manufacturing the backing portion 204 with an appropriate structure (e.g., a lattice structure as shown in FIGS. 2A-C, e.g., a honeycomb structure or a structure comprising regularly spaced cylindrical pores) corresponding to a desired compressibility, (3) using an appropriate photo-crosslinkable polymer (e.g., a more flexible polyurethane) for preparing the backing portion 204, and (4) using one or more appropriate additives (or a different amount of additives) during preparation of the backing portion 204.

For conventional polishing pads, the polishing rate is non-uniform near the edge of the wafer (e.g., near the retaining ring used to hold the wafer to the carrier head). This non-uniform polishing at the edge of the wafer is sometimes referred to as an "edge effect" or "edge exclusion." Certain embodiments of the polishing pads described herein reduce or eliminate this problem.

Figure 11:
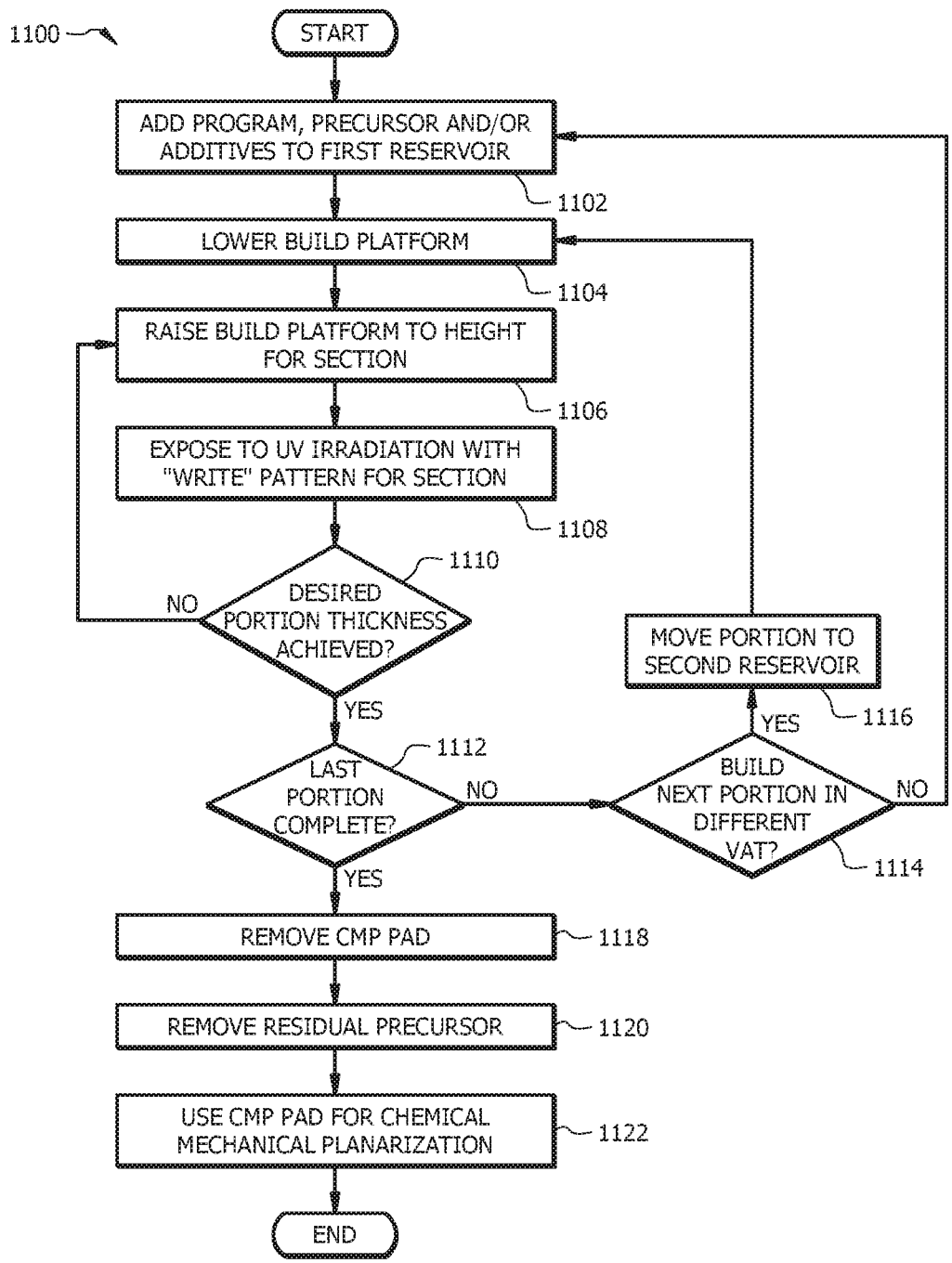
FIG. 11 is a flowchart illustrating an example method of preparing and using any of the polishing pads described in this disclosure.

The polishing portion 202 (or the entirety of the polishing pad) may be formed in a continuous layer-by-layer fashion (e.g., as described with respect to FIG. 11). This allows continuous changes in pore structure and pore size to be formed according to precise specifications using the vat-based manufacturing process. This precise control of pore geometry in turn facilitates improved control of the density, hardness, and other physical characteristics of the polishing pad 102. In general, the size, shape and distribution of pores (see FIG. 3) may be tightly controlled using the processes described herein. Pores may be uniform in a horizontal plane relative to the polishing surface but may vary in a vertical plane. For example, there may be smaller, substantially spherical pores with a low void volume in a horizonal plane at a distance away from the polishing surface. The pore size, shape and void volume can then change as the distance of a horizontal plane approaches the polishing surface. The change can be gradual or a step change.

Additionally, the size, shape and distribution of the pores can be varied along the horizontal plane to give regions of varying compressibility on the pad 102, as shown in FIG. 4. For example, pores of differing sizes, structures, and/or densities can be formed in either or both of the polishing portion 202 and the backing portion 204 such that regions of the polishing pad 102 each have different compressibility. For example, a region of the pad 102 with pores of a first shape (e.g., a cylindrical shape) will have a different compressibility than a region with pores of a different second shape (e.g., a polygonal shape such as a honeycomb).

Additionally, the size of the pores and the volume of the pores (e.g., the void volume of the pad 102) can be modulated to control the compressibility of both the polishing pad as a whole and regions of the polishing pad 102. For example, the pad 102 may be constructed to have a more compressible region around the edge of the pad, while the region near the center of the pad 102 is less compressible. This variation of pad compressibility may improve the polishing characteristics to reduce edge erosion and improve planarization efficiency for certain substrates 106. The physical characteristics of the pad 102 (e.g., its hardness and compressibility) can thus be precisely designed to match the slurries 110 used during polishing and the substrates 106 being polished.

Still referring to FIG. 4, the structure of the backing portion 204 in particular may be tuned to provide different regions (e.g., areas) of the pad that are suited for different polishing needs. For example, as shown in FIG. 4, the edge of a wafer 106 being polished (i.e., the region near the retaining ring) may experience a greater pressure than the center of the wafer 106 via a downward force (DF) 402 applied to the wafer 106 during polishing. A conventional pad would typically "overpolish" this edge portion of the wafer 106. The polishing pad 102 shown in FIG. 4, however, includes a backing portion 204 that is more compressible in the region where the retaining ring edge of the wafer 106 contacts the pad 102, thereby reducing or eliminating "overpolishing" and facilitating more uniform polishing over the entire wafer 106 surface.

As described above, the backing portion 204 can be provided with a different compressibility than the polishing portion by one or more of: (1) using a different extent of curing during manufacturing (e.g., a different intensity of UV radiation), (2) manufacturing the polishing portion 204 with a different structure (e.g., a honeycomb structure or a structure comprising regularly spaced cylindrical pores) than that of the polishing portion 202, (3) using a different photo-crosslinkable polymer for preparing the backing portion 204 than for preparing the polishing portion 202, and (4) using different additives (or a different amount of additives) during preparation of the backing portion 204 than during preparation of the polishing portion 202.

It should be understood that FIG. 4 presents one example embodiment of how the compressibility of the polishing pad 102 can be varied spatially to improve polishing performance. The present disclosure contemplates polishing pads 102 with any appropriate compressibility profile for a given application. In general, during a polishing process, the wafer 106 may be contacted to the appropriate region(s) of the pad 102 based on the known compressibility profile of the pad 102.

Example CMP Pad Designs

The structures of CMP pads 102 prepared via the vat-based manufacturing processes described in this disclosure may facilitate improved planarization and improved pad 102 lifetime. Examples of pad designs are shown in FIGS. 5A-5B and 6A-6D, which are described below. Certain pad designs described herein may only be achieved using the unique vat-based manufacturing processes described herein (see, e.g., FIG. 11). While in some embodiments, the unique preparation processes described in this disclosure may facilitate the preparation of these pad designs, it should be understood that in some embodiments certain pad designs described herein may be achieved using any appropriate fabrication process or combination of processes (e.g., molding, casting, deposition-based additive manufacturing, etc.).

Figure 5A:
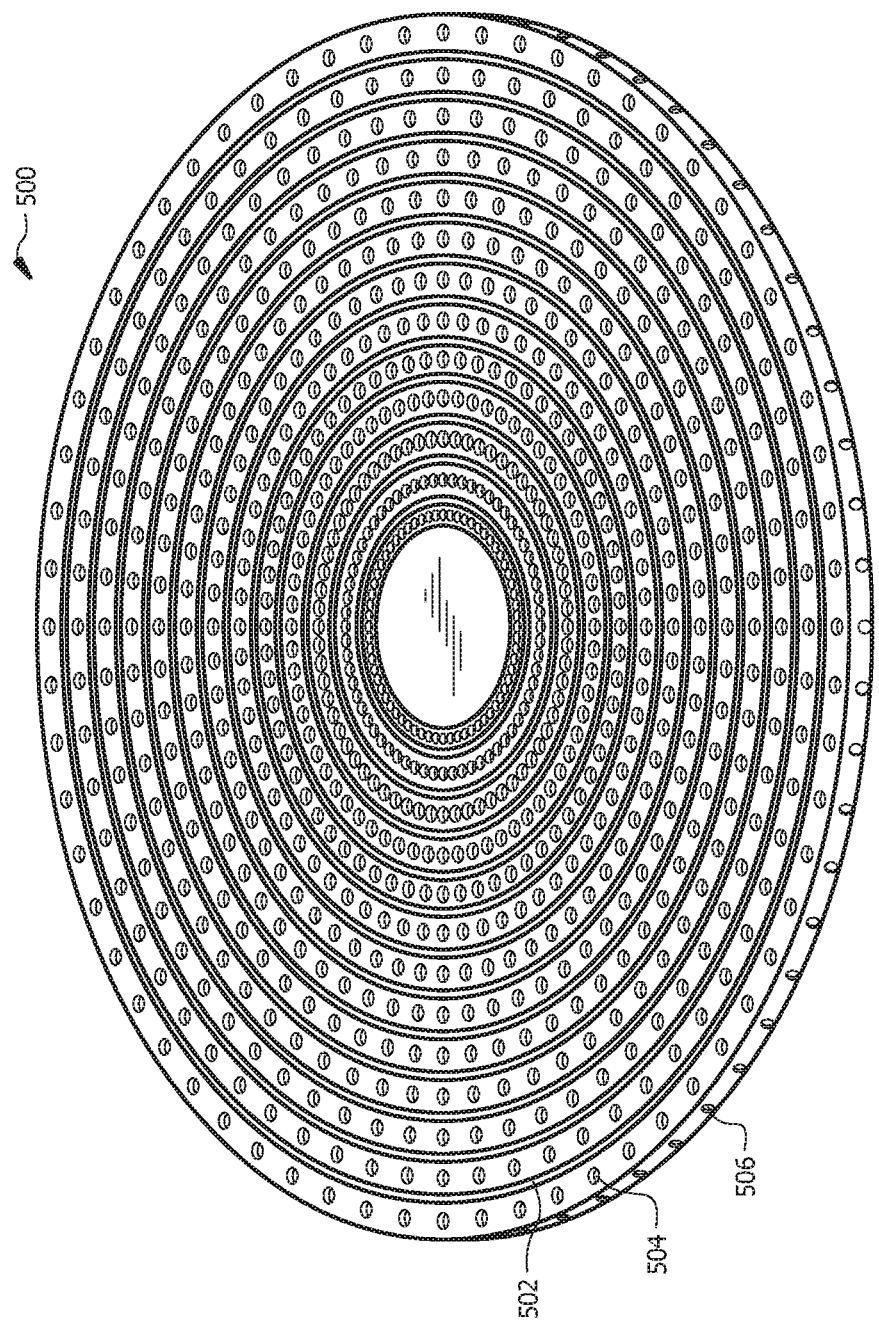
FIGS. 5A and 5B are diagrams of an example polishing pad according to an illustrative embodiment
Figure 5B:
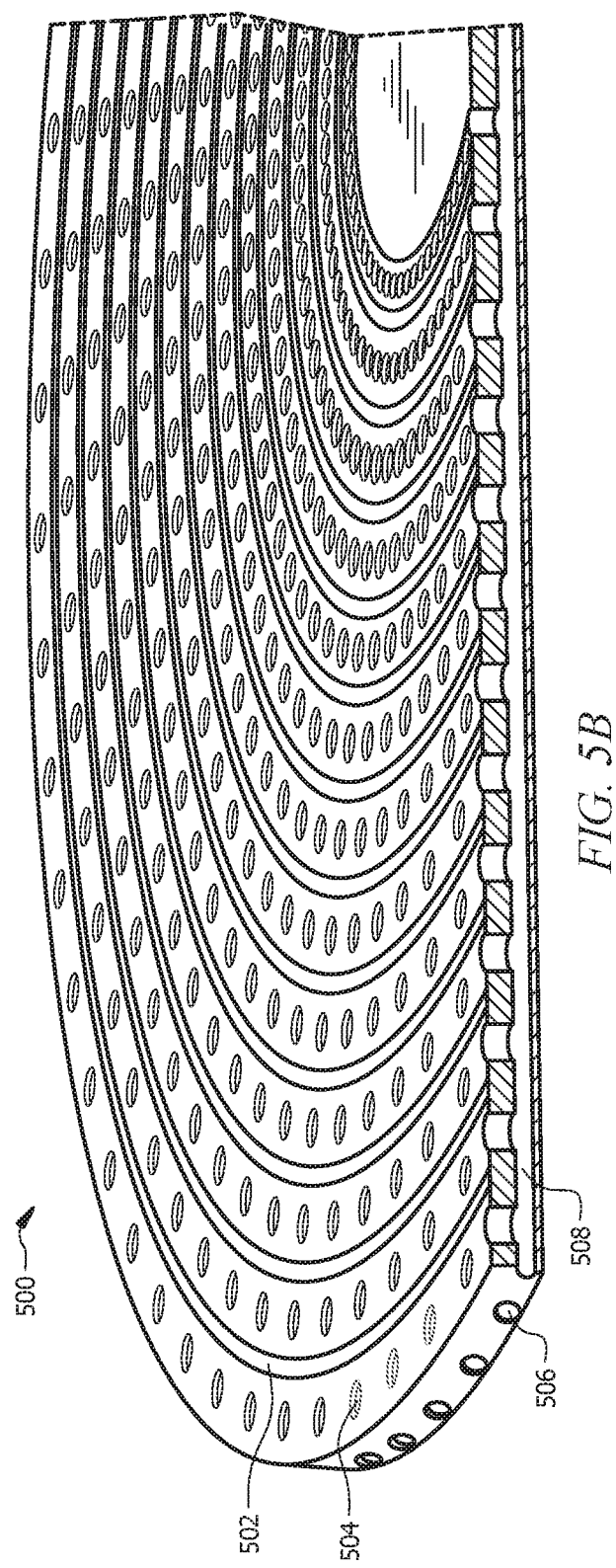

FIGS. 5A and 5B illustrate a design of an example pad 500. Pad 500 is an example embodiment of the pad 102 of FIG. 1. FIG. 5A shows a top perspective view of the polishing pad 500, and FIG. 5B shows a perspective view of a cross-section showing the internal structure of the polishing pad 500. As illustrated in FIGS. 5A and 5B, the pad 500 includes grooves 502, top-side holes 504, and outlet holes 506. As illustrated in the cross-section image of FIG. 5B, top-side holes 504 extend partially into the surface of the pad 500 and are coupled to channels 508, which are embedded beneath the surface of the pad 500. The design of pad 500 generally facilitates improved transport of fresh slurry 110 to a surface being planarized by the pad 500. The grooves 502 facilitate transport of fresh slurry 110 (i.e., slurry 110 which still contains active components which aid in the CMP process) toward the surface of a wafer 106 being planarized (see also FIG. 1). Meanwhile, expended slurry 110 (i.e., slurry 110 in which the active components have largely already been consumed during the planarization process) and/or polishing byproducts may be transported away from the surface of the wafer 106 via the holes 504, 506 and channels 508 (e.g., when the pad 500 is rotated, see also FIG. 1). As such, the concentration of fresh slurry 110 near the surface being planarized is increased and dilution of fresh slurry 110 by expended slurry 110 is decreased.

The grooves 502 may be concentric as shown in the example of FIGS. 5A and 5B or any other appropriate pattern (e.g., concentric, concentric and radial design, or a hexagonal close-packed design). The grooves 502 may have any appropriate pitch and width. The pad 500 may include any appropriate number of grooves 502. For example, the number of grooves can be increased or decreased as needed to be able to hold more or less fresh slurry 110 during polishing.

The diameter of the top-side holes 504 may vary from about ten mils to about 400 mils (1 mil=1 thousandths of an inch). In general, larger top-side holes 504 may facilitate increased transport of expended slurry 110 away from a surface being polished. In some embodiments, if larger top-side holes 504 are present in the pad 500, the number of holes 504 may be decreased to facilitate appropriate spacing and structural properties of the pad 500. The number of radial lines of holes 504 can vary from one to about 128. In general, the presence of more radial lines of holes 504 facilitates increased slurry 110 transport through the holes 504. Generally, the number of holes 504 per radial line can vary. The example of FIG. 5A includes thirteen top-side holes per radial line. However, more or fewer holes 504 may be present in each radial line.

While the examples of FIGS. 5A and 5B show circular top-side holes 504, it should be understood that the holes 504 may have any shape. For example, the top-side holes 504 (and the outlet holes 508) may have a square, rectangular, oval, star, triangular, hexagonal, semi-circular, or conical shape. A hole 504 with a conical shape has a diameter that decreases with depth into the surface of the pad 500. The different shapes of holes 504 may facilitate different slurry 110 transport properties which may be desirable for certain applications. In some embodiments, the shape of the holes 504 may only be achieved using the vat-based manufacturing approaches described in this disclosure (see, e.g., FIG. 11).

The channels 508 are generally shaped and positioned to receive slurry via the top-side holes 504 and allow transport of the slurry 110 out of the pad 500 via the outlet holes 506. As such, the channels 508 and outlet holes 506 may have any appropriate configuration for facilitating this transport or slurry 110. The example of FIG. 5B illustrates example channels 508 that extent radially from the center of the pad 500 to a corresponding outlet hole 506. However, any other appropriate channel 508 and outlet hole 506 configuration is possible. For instance, in some embodiments, the top-side holes 504 may have a different configuration than the circular pattern illustrated in FIGS. 5A and 5B. For instance, the top-side holes 504 may be distributed in a spiral shape, in a square shape, in straight lines, in a box-like pattern, at diagonal angles, and the like. The channels 508 and outlet holes 506 have an appropriate complementary pattern or layout to facilitate transport of slurry 110 which is received via the holes 504, out of the outlet holes 506 during rotation of the pad 500.

The diameter of the pad 500 can vary based on intended use. For example, the diameter of the pad 500 may range from about eight inches to about 46 inches. The thickness of the pad 500 can also vary. For example, the thickness of the pad 500 may range from about 60 mils to about 600 mils. In some embodiments, the thickness of the pad 500 is about 400 mils. The size of the top-side holes 504 and outlet holes 506 may be adjusted to accommodate slurry 110 transport in pads 500 of different thickness.

In some embodiments, the vat-based manufacturing processes described in this disclosure (see FIG. 11) uniquely facilitate fabrication of the example polishing pad 500. For example, the polishing pad 500 with top-side holes 504 of the appropriate depth and dimensions cannot be prepared via casting or molding. Reliable generation of both holes 504, 506 and the channels 508 of an appropriate size and configuration may not be possible via drilling because of the limitations of available drilling technology. For example, it may not be feasible to retroactively drill the holes 504, 506 and channels 508 in a conventional polishing pad such that the holes 504, 506 and channels 508 are appropriately aligned for slurry 110 transport, as in the example pad 500 of FIGS. 5A and 5B. Moreover, an extrusion-based additive manufacturing approach may not be able to reliably create the pad 500 with holes 504, 506 and channels 508 because internal supports may be needed for each channel 508 and outlet hole 506. Such supports may hinder slurry 110 transport in the pad.

Figure 6A:
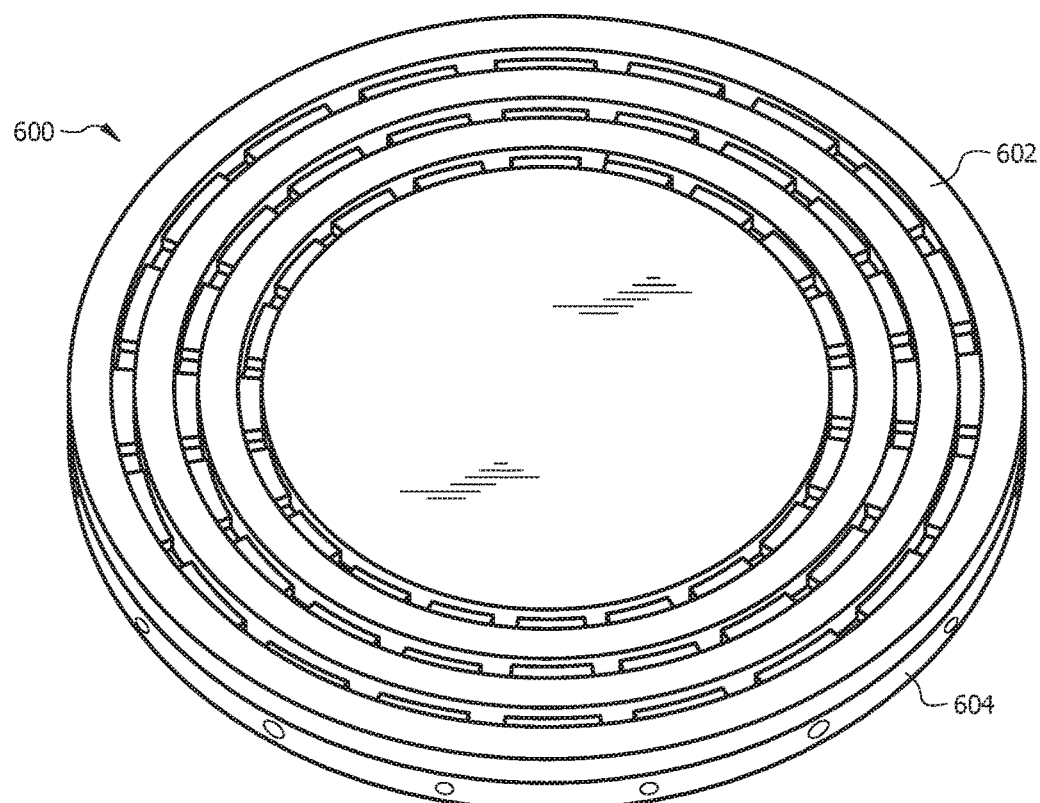
FIG. 6A-6D are diagrams of an example polishing pad according to an illustrative embodiment.

FIGS. 6A-6D illustrate an example pad 600. Pad 600 is an example embodiment of the pad 102 of FIG. 1. As described further below, the pad 600 facilitates the transport of expended slurry 110 and/or debris/byproducts formed during the polishing process away from a surface being polished. More particularly, pad 600 includes top grooves 606 for retaining slurry 110 near the surface being polished as well as top-side holes 608, which are coupled via channels 612 to outlet holes 614, for transporting expended slurry 110 away from the surface being polished. FIG. 6A shows the pad 600 with a top potion 602 and a backing portion 604. While the top portion 602 and backing portion 604 are described separately with respect to FIGS. 6B and 6C below, it should be understood, that the pad 600 may be a single-body, continuous structure. For example, the pad 600 may be prepared using a method of additive manufacture (e.g., as described with respect to FIG. 11 below) such that the top portion 602 and backing portion 604 form one single-body structure. In other embodiments, the top portion 602 and backing portion 604 may be prepared separately (e.g., using any appropriate method) and combined to form the pad 600.

The diameter of the pad 600 can vary based on intended use. For example, the diameter of the pad 600 may range from about eight inches to about 46 inches. The thickness of the pad 600 can also vary. For example, the thickness of the pad 600 may range from about 50 mils to about 300 mils. For example, the thickness of the top portion 602 may range from about 30 mils to about 160 mils, and the thickness of the backing portion 604 may range from about 20 mils to about 100 mils.

Figure 6B:
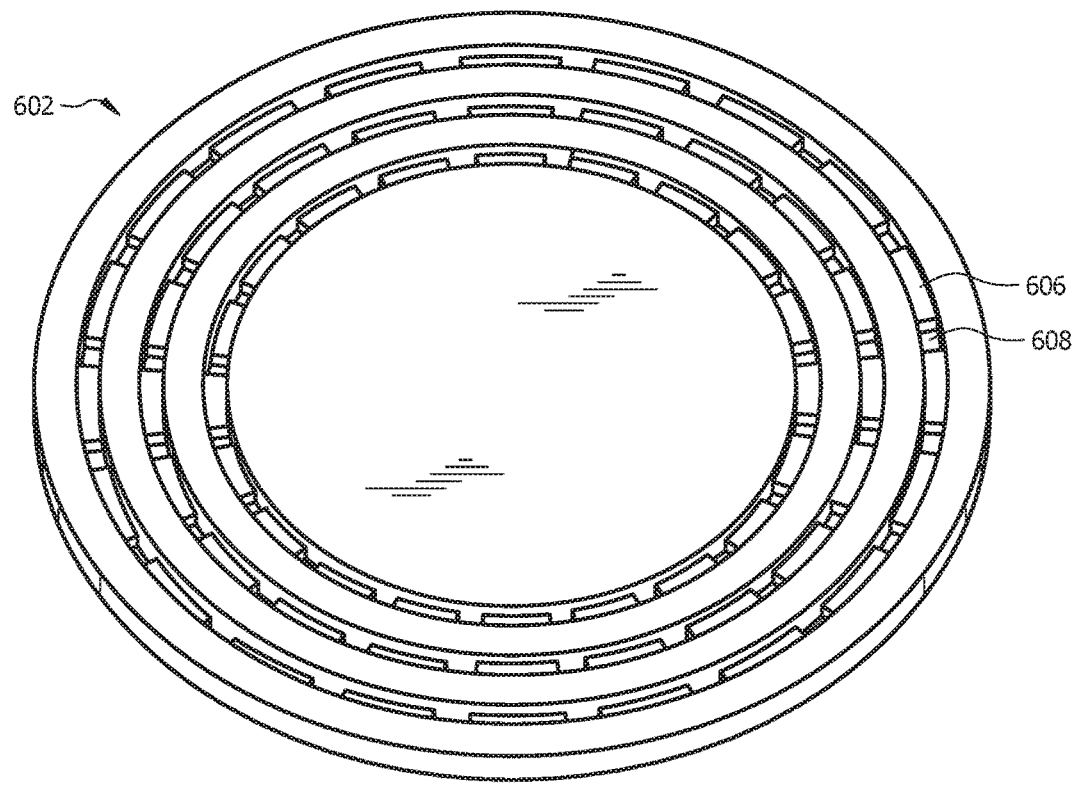

As shown in FIG. 6B, the top portion 602 includes grooves 606 and top-side holes 608. The example of FIG. 6B includes concentric grooves 606. However, it should be understood that the grooves 606 may have any appropriate pattern (e.g., a concentric, concentric and radial design, or hexagonal close-packed design). The grooves 606 may have any appropriate pitch and width. The top portion 602 may include any appropriate number of grooves 606. For example, the number of grooves 606 may be increased or decreased as needed to be able to hold more or less fresh slurry 110 during polishing.

The top-side holes 608 may be located on the bottom of the grooves 606 and facilitate the evacuation and/or drainage of expended slurry 110 and/or any byproducts of polishing away from the surface being polished. In other embodiments, the top-side holes 608 may be located on the top portion 602. For instance, the top-side holes 608 may be positioned on the surface of the top portion 602 (e.g., similarly to the top-side holes 504 of pad 500 described above with respect to FIGS. 5A and 5B). The diameter of the top-side holes 608 may vary from about five mils to about 500 mils. The size of the top-side holes 608 is generally selected to balance between the benefits of transporting slurry 110 away from a polished surface when the holes 608 are larger and the ability to limit the amount of slurry 110 consumed when holes 608 are smaller.

While the example of FIG. 6B shows rectangular top-side holes 608, it should be understood that the holes 608 may have any shape. For example, the top-side holes 608 may have a square, circular, oval, star, triangular, hexagonal, semi-circular, or conical shape. In some embodiments, the shape of the holes 608 may only be achieved using the vat-based additive manufacturing approaches described in this disclosure (see, e.g., FIG. 11). The top-side portion 602 may include anywhere from one to 100,000 top-side holes 608, and the top-side holes 608 may be distributed according to any appropriate pattern.

Figure 6C:
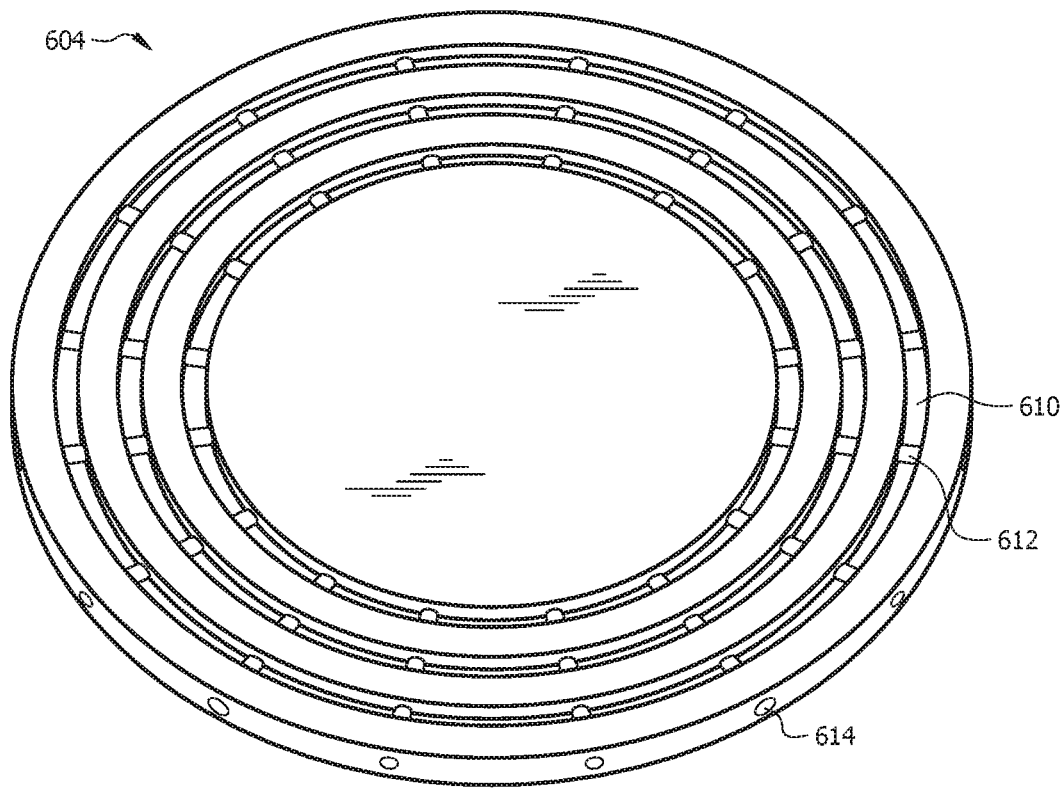

As shown in FIG. 6C, the backing portion 604 includes concentric channels 610 and radial channels 612, which couple the top-holes 608 to the outlet holes 614 in order to facilitate the transport of expended slurry 110 and/or byproducts of planarization away from the surface being polished. The backing portion 604 may be the same or a different material to that of the top portion 602. In some embodiments, the backing portion 604 is a relatively soft material compared to the top portion 602. In some embodiments, the backing portion 604 has a lattice structure (e.g., similar to the backing portion 204 of FIGS. 2A-2C). The size of the channels 610, 612 may range from about ten mils to about 90 mils. The channels 610, 612 and the outlet holes 614 may have any shape. For example, the channels 610, 612 and the outlet holes 614 may have a square, rectangular, circular, oval, star, triangular, hexagonal, semi-circular, or conical shape.

Figure 6D:
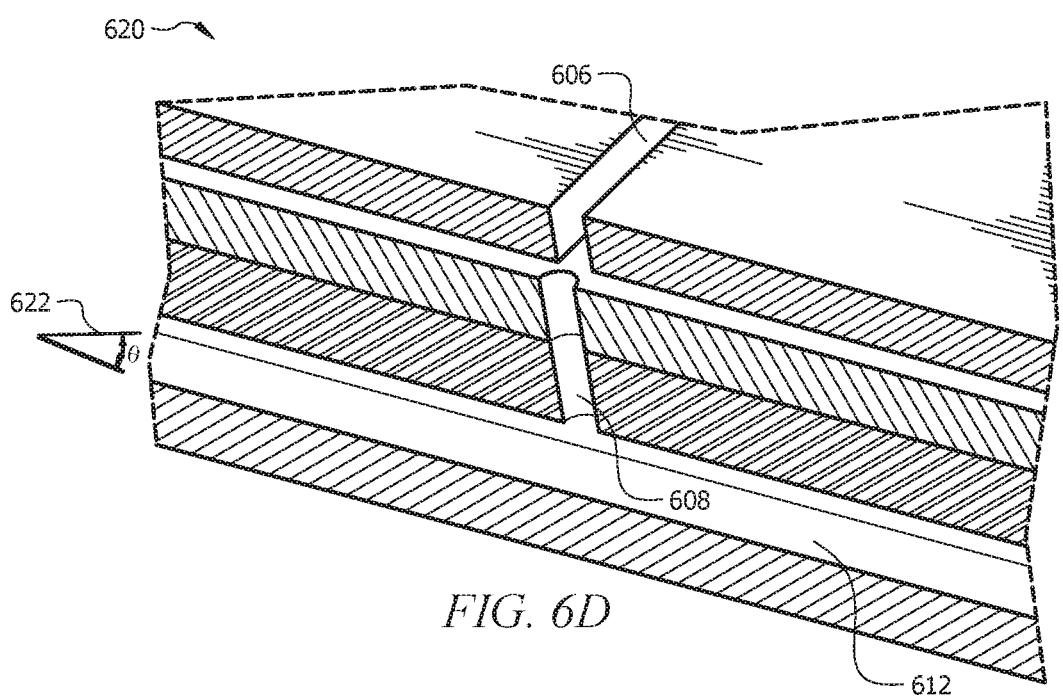

In some embodiments, the radial channels 612 may be at an angle such that the channel 612 is at a higher elevation near the center of the backing portion 604 and at a lower elevation near the edge of the backing portion 604. This angled structure may further facilitate the transport of expended slurry 110 and/or polishing byproducts through the radial channels 612 and out of the outlet holes 614. FIG. 6D illustrates a cross section of a portion 620 of an example pad 600 with such an angled channel 612. The channel 612 transports slurry 110 from left to right (i.e., from the center of the pad 600 to the outlet hole 614 of the channel 612). The channel 612 may be at an angle 622 of up to about 15 degrees.

CMP Pads with Buried Grooves

As described above, one objective of chemical mechanical planarization is to achieve a high polishing uniformity. If different areas on the substrate 106 are polished at different rates, then it is possible for some areas of the substrate 106 to have too much material removed ("overpolishing") or too little material removed ("underpolishing"). Conventional CMP pads may include a limited range of groove designs to improve CMP performance to some extent. However, after use, these grooves may effectively be removed from the surface of conventional polishing pads. Once the grooves are gone, CMP performance is generally diminished and a new polishing pad is used, resulting in down-time during which wafers cannot be processed (e.g., using a system such as the one described above with respect to FIG. 1). There exists a need for CMP pads, and methods of their manufacture and use, that can provide improved polishing uniformity and increased polishing pad lifetime.

This disclosure not only recognizes problems of previous CMP pads, including those described above, but also a solution to these problems. In some embodiments, the polishing pads 102 described in this disclosure provide increased polishing pad lifetimes so that the polishing pads 102 may be used for longer periods of time without requiring processes to be stopped frequently to replace the polishing pad 102. In various embodiments, the CMP pads 102 may include buried grooves and/or embedded channels. The buried grooves generally facilitate increased polishing pad lifetimes (see, e.g., FIGS. 7A-7C), while the channels (see FIGS. 8A-E) may facilitate, amongst other things, improved performance during use (e.g., byproducts and/or debris generated during CMP may be removed from the surface and/or fresh slurry 110 may be replenished near the surface being planarized). The buried grooves and/or grooves may also or alternatively facilitate more straightforward polishing pad preparation (e.g., by providing a flow path to remove residual chemicals left behind after the fabrication process—see, e.g., step 1120 of FIG. 11 and corresponding description below). In some embodiments, the polishing pads 102 include reservoirs to collect slurry 110 and/or move residual materials (e.g., debris generated during polishing, slurry byproducts, etc.) away from the surface being polished (see, e.g., FIGS. 9 and 10A,B). The present disclosure further recognizes that a polishing pad 102 with improved chemical and mechanical properties, such as the polishing pads 102 with buried grooves and/or channels described below, may particularly be efficiently produced using a vat-based manufacturing process.

This disclosure further recognizes that the performance of CMP may be improved when the volume of exposed grooves (i.e., the combined volume of all exposed grooves on the surface of a polishing pad) is within a predetermined range. The predetermined range may be measured relative to an initial volume of all grooves prior to use of a polishing pad 102 for CMP. For example, in conventional polishing pads, only about 80% of a groove height (and thus of groove volume) is useable before CMP performance degrades precipitously. For instance, for certain CMP processes it may be desirable to have a groove volume that is greater than about 20% of an initial groove volume. In some embodiments, the groove volume of the polishing pad 102 is maintained in a range from about 90% to about 25% of the initial groove volume. Maintaining groove volume within a predetermined range, such as one of those described above, may allow CMP to be performed at a lower slurry 110 flow rate (i.e., the system 100 may require less slurry 110 to be introduced during the CMP process), thereby reducing costs.

Figure 7A:
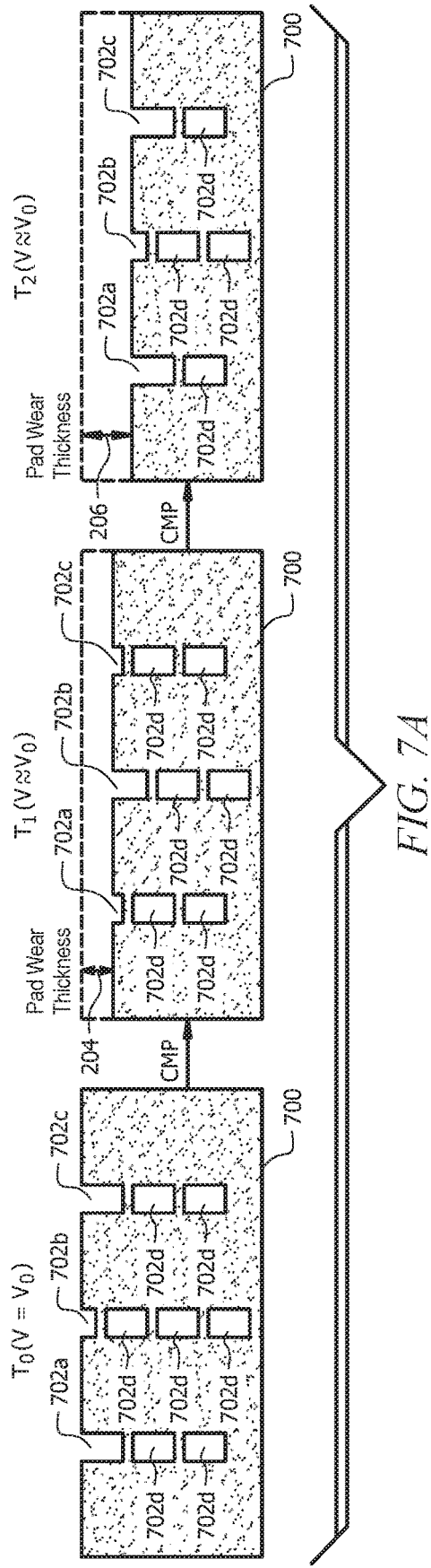
FIGS. 7A-7C are diagrams illustrating polishing pads with buried grooves, according illustrative embodiments of this disclosure.

FIG. 7A is a diagram illustrating a cross-sectional side-view of a portion 700 of a polishing pad 102 at an initial time ($t_0$) and at two other time points ($t_1$ and $t_2$) following use for CMP. The polishing pad portion 700 includes exposed grooves 702a-c and buried grooves 702d. As an example, the grooves 702a-d may have a width in a range of about 5 mils (1 mil=1 thousandths of an inch) to about 500 mils (e.g., or from about 10 mils to about 50 mils) and a height in a range of about 5 mils to about 500 mils (e.g., from about 10 mils to about 50 mils). However, the grooves 702a-d may have any other height and width. The grooves 702a-d are generally offset vertically (e.g., are buried at different depths) as shown in the example of FIG. 7A such that during the use of polishing pad 102, the volume (V) of the exposed grooves 702a-c is approximately constant, or maintained within a predetermined range, near its initial value ($V_0$). For example, at time $t_1$, after CMP is performed for a period of time, a top layer 704 of the polishing pad 700 is removed through conditioning and general wear. However, because the center buried groove 702d from time to is now exposed as groove 702b at time $t_1$, the volume of the exposed grooves remains approximately constant, or within a predetermined range, near $V_0$. In some embodiments, the grove volume is maintained with less than an 80% variation from $V_0$. In other embodiments, the groove volume is maintained with less than a 25% variation from $V_0$. Similarly, at time $t_3$, following further CMP, the left and right-most buried grooves 702d become exposed grooves 702a and 702d after layer 706 is removed, resulting in a consistent groove volume at or within a predetermined range near $V_0$.

Figure 7B:
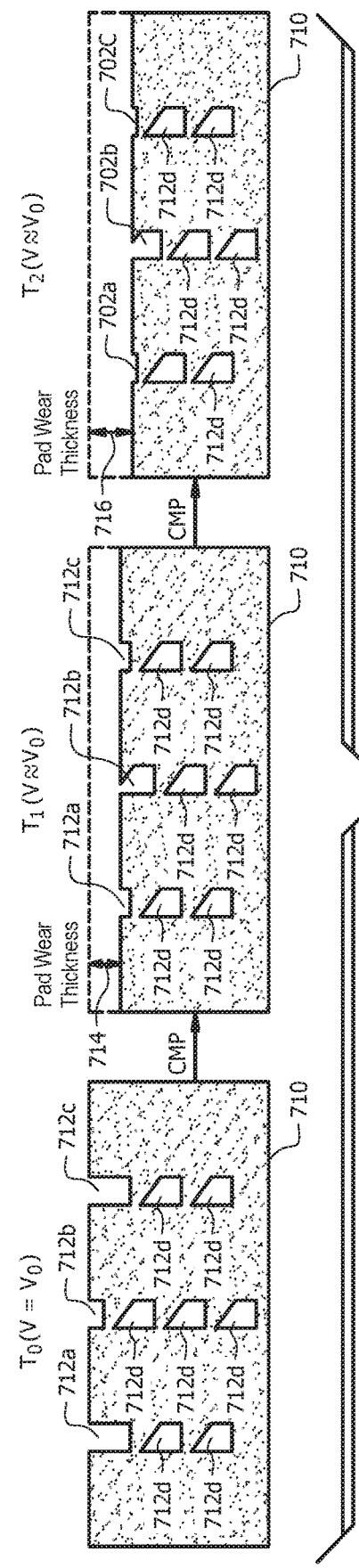

FIG. 7B is a diagram illustrating a cross-sectional side-view of another embodiment of a portion 710 polishing pad 102. Polishing pad portion 710 includes buried grooves 712d with a variable height. Grooves 712a-d may have a similar size to that of grooves 702a-d described above. This design facilitates the gradual opening of the grooves 712d during CMP. This may decrease the amount of pad debris that is introduced during CMP and further improve CMP results. FIG. 7B illustrates a cross-sectional side-view of a portion 710 of polishing pad 102 at an initial time ($t_0$) and at two other time points ($t_1$ and $t_2$) following CMP. Polishing pad portion 710 includes exposed grooves 712a-c and buried grooves 712d. The grooves 712a-d are generally offset vertically (e.g., are buried at different depths) as shown in the example of FIG. 7B such that during the use of polishing pad 710, the volume (V) of the exposed grooves 712a-c is approximately constant, or maintained within a predetermined range, near its initial value ($V_0$). For example, at time $t_1$, after CMP is performed for a period of time, a top layer 714 of the pad portion 710 is removed. However, because the center buried groove 712d from time to is now exposed as groove 712b at time $t_1$, the volume (V) of the exposed grooves remains approximately constant, or within a predetermined range, near $V_0$. Similarly, at time $t_3$, following further CMP, the left and right-most buried grooves 712d are now exposed grooves 712a and 712d after layer 716 is removed, resulting in a consistent groove volume (V) at or within a predetermined range near $V_0$.

While the examples of FIGS. 7A and 7B show only two to three layers of buried grooves 702d, 712d, it should be understood that there may be many more layers of buried grooves 702d, 712d. For example, in some embodiments, there are up to or greater than 30 layers of buried grooves 702d, 712d. The number of layers of buried grooves 702d, 712d is generally only limited by the thickness of the polishing pad 102. Vat based manufacturing facilitates the preparation of relatively thick polishing pads 102 with many layers of buried grooves 702d, 712d. Accordingly, the polishing pads 102 may be used continuously (e.g., without conditioning) for long periods of time while maintaining a nearly constant groove volume at or within a predetermined range near $V_0$.

Another benefit of the buried grooves 702d, 712d of the example polishing pads 102 is to provide reinforcement and support to the overall structure of the polishing pads 102, thereby facilitating the buried groove designs illustrated in FIGS. 7A and 7B. Accordingly, buried grooves 702d, 712d may be formed without significantly sacrificing the mechanical properties (e.g., rigidity) of the overall structures of polishing pads 102. For this additional reason, polishing pad lifetimes can be extended compared to those of conventional polishing pads.

Very deep grooves generally cannot be used because very large groove volumes can lead to "slurry starving," or conditions where so much slurry is lost to the volume of the grooves that sufficient slurry is not available at the surface of the polishing pad for CMP. When grooves are too shallow (e.g., less than the newly recognized 20% of the initial volume level, results of CMP may begin to degrade (e.g., because of overheating). This can result in poor polishing uniformity (e.g., increased within-wafer non-uniformity (WIWNU) and/or increased defect density).

Figure 7C:
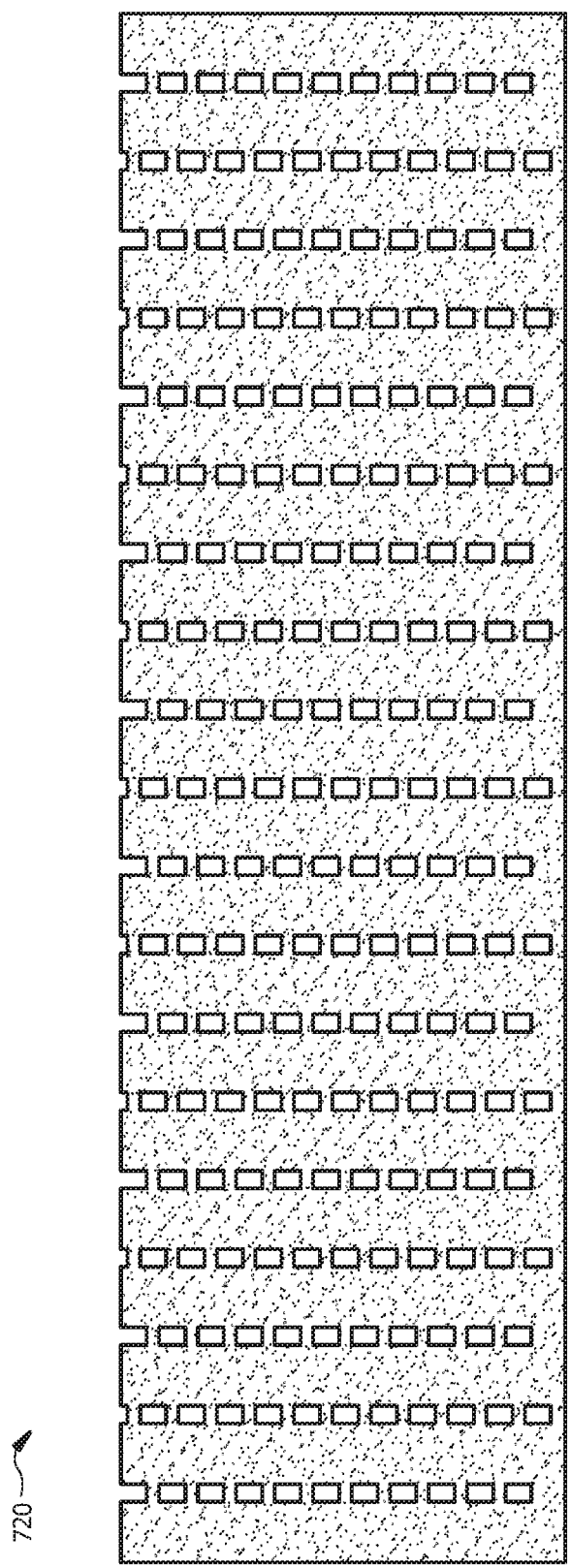

FIG. 7C is a diagram illustrating another embodiment of a portion 720 of a polishing pad 102. Polishing pad portion 720 includes smaller grooves with a much smaller pitch (i.e., the center-to-center distance between adjacent grooves) than the grooves 702a-d of polishing pad portion 700 described above, for example. Polishing pad portion 720 generally has a smaller groove volume than do example polishing pad portions 700, 710 described above with respect to FIGS. 7A and 7B. For instance, the grooves of polishing pad portion 720 may be two to ten times (or more) smaller (i.e., in terms of length and width) than the grooves 702a-d described above with respect to polishing pad portion 700 of FIG. 7A. A smaller groove volume may allow the pad portion 720 to provide high-performance CMP polishing while consuming less slurry material than is required using either conventional polishing pads or the polishing pad portions 700, 710 described above. Generally, using very small grooves like those of polishing pad potion 720 may cause the polishing pad portion 720 to degrade relatively rapidly such that conventional polishing pads with small grooves would be expended rapidly (i.e., because the grooves would be "lost" after only a brief use). However, by using multiple layers of buried grooves, the small grooves of polishing pad portion 720 can be used with acceptable, or even improved, polishing pad lifetime.

CMP Pads with Channels

FIGS. 8A-8E illustrate various embodiments of polishing pads 102 which include channels. In some cases, the channels provide a flow path between buried grooves (see FIGS. 8A-8E), between buried grooves and the top surface of the polishing pad (see FIGS. 8A-8D), and/or between buried grooves and another edge or surface of the polishing pad 102 (see FIGS. 8D and 8E). These flow paths may facilitate the removal of slurry 110, particulate debris that forms during polishing, and/or chemical byproducts formed during CMP away from the surface of a wafer 106 that is being polished, thereby improving the quality of surfaces planarized using these polishing pads 102.

Figure 8A:
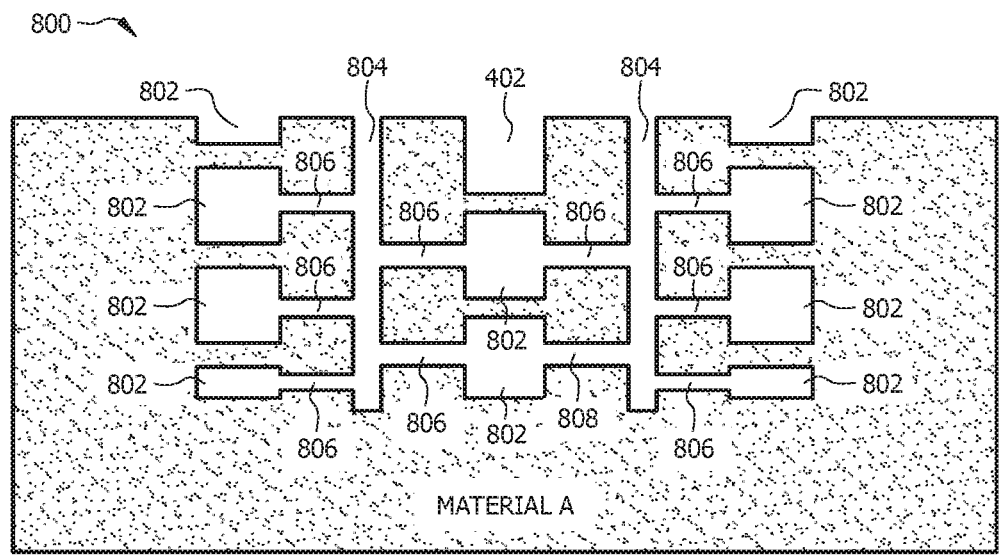
FIGS. 8A-8E are diagrams illustrating example polishing pads with buried grooves and channels, according to various illustrative embodiments.
Figure 8B:
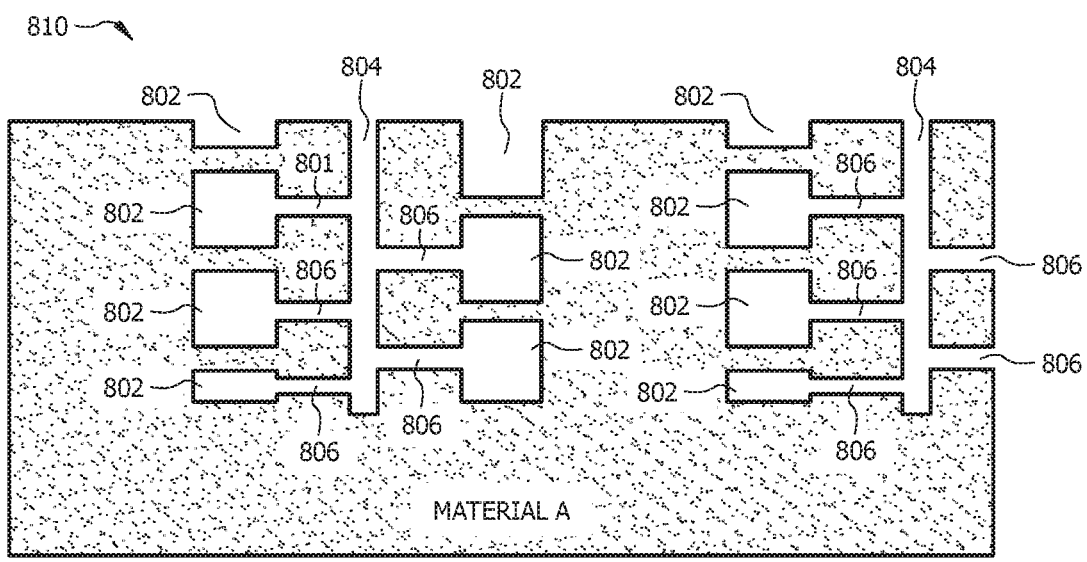

FIGS. 8A and 8B illustrate portions 800 and 810 of polishing pads 102 which include grooves 802, vertical channels 804, and horizontal channels 806. For example, a pad portion 800, 810 may be a portion of the polishing layer 204 of the polishing pad 200 described above with respect to FIGS. 2A-2C. The channels 804, 806 provide a flow path for residual fluid (e.g., residual polymer precursor remaining in the grooves 802 following vat-based processing) to drain from the polishing pad portions 800, 810. For example, following their manufacture and before their use, the polishing pad portions 800, 810 may be rinsed (e.g., see step 1120 of FIG. 11, described below), and residual fluids, which would otherwise be trapped in the grooves 802 (i.e., if channels 804, 806 were not present), may be drained from the grooves 802. The polishing pad portions 800, 810 can then be used for CMP (e.g., using system 100 described above with respect to FIG. 1) without potentially contaminating the surface of a wafer 106 or any other surface being planarized with the residual precursor material.

Figure 8C:
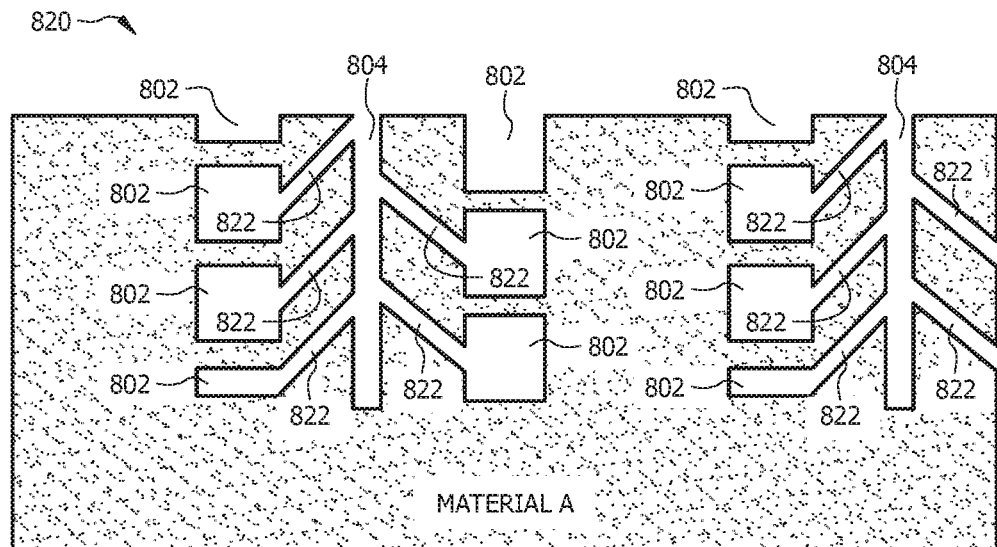
Figure 8D:
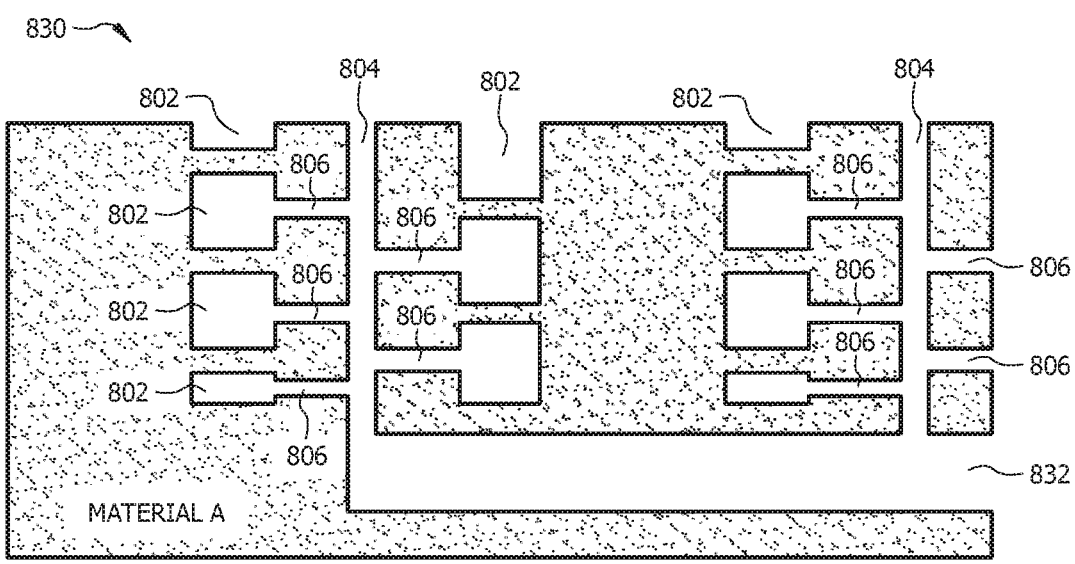

FIGS. 8C and 8D illustrate polishing pad portions 820, 830 which have alternative groove and channel designs. Pad portions 820, 830 may be a portion of the polishing layer 202 of the CMP pad 200 described above with respect to FIGS. 2A-2C. These groove and channel designs, for example, may be suited for both providing flow paths for the removal of residual precursor material following polishing pad fabrication and directing expended slurry 110 away from the surface of the polishing pad portions 820, 830. As described above, the expended slurry 110 generally corresponds to slurry 110 in which active components have already reacted or have otherwise been consumed. For example, polishing pad portion 820 of FIG. 8C has angled channels 822 connecting grooves 802 to the vertical channels 804. The angled channels 822 may facilitate drainage of precursor fluid from the grooves 802 (e.g., when polishing pad 820 is placed top-side down) and may facilitate the flow of expended slurry and other debris generated during CMP away from the surface of the polishing pad portion 820.

Polishing pad portion 830 shown in FIG. 8D includes grooves 802 connected via horizontal channels 806 to vertical channels 804 (e.g., similar to polishing pads portions 800 and 810 described above). Polishing pad portion 830 also includes a horizontal drain channel 832, which facilitates the drainage of slurry 110 out of the polishing pad portion 830 (e.g., out of an edge of the pad—see, e.g., pads 500 and 600 described above with respect to FIGS. 5A-6D). In some cases, the grooves 802 and channels 804, 806 may be filled with slurry 110, and this slurry 110 may be released during CMP to replenish active components near the surface being planarized.

Figure 8E:
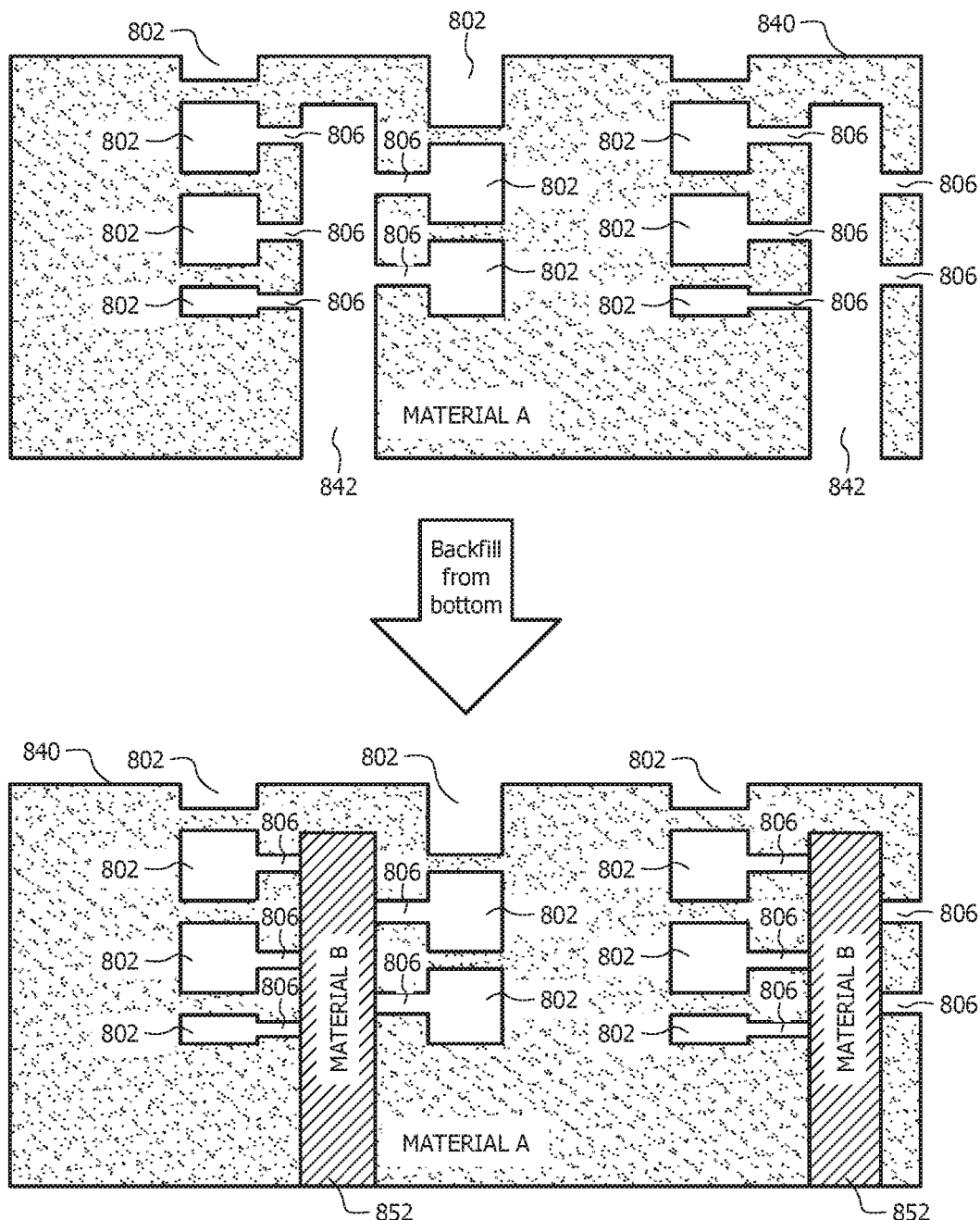

FIG. 8E illustrates a portion 840 of a polishing pad 102 prepared with a vertical drain channel 842 which extends from the bottom of the polishing pad 102 to the top-most buried grooves 802. The design of the polishing pad portion 840 facilitates the removal of residual material from the grooves 802 after the polishing pad 840 is prepared (see, e.g., step 1120 of FIG. 11, described below). For instance, liquid precursor material from the vat-based manufacturing process used to manufacture polishing pad 102 with the design of portion 840 may be drained via channels 842. If is not desirable to retain these channels during use of the polishing pad portion 840. The channels 842 may be back-filled with a second material 852. The second material 852 may be different than the pad material 840, or the second material 852 may be the same as the pad material 840, as illustrated in FIG. 8E. In some embodiments, the second material 852 may be slurry 110 or any other material which, when released during use of the polishing pad 102 with portion 840, promotes improved CMP of a wafer 106 or other material being planarized.

CMP Pads with Slurry Reservoirs

During use of conventional polishing pads, a gradient develops in the concentration of active components in the slurry 110, for example, from the leading to the trailing edge of a wafer 106 that is being planarized. In other words, the concentration of active slurry components may be decreased near the surface being planarized. This can limit the performance of these conventional polishing pads. Various embodiments of the polishing pads 102 described in this disclosure include slurry reservoirs which can aid in overcoming challenges and performance limitations associated with decreased slurry 110 concentration near the surface being planarized. The slurry reservoirs generally provide a source of slurry active ingredients near the surface of the polishing pads 102 such that the active materials are rapidly replenished after they are consumed during CMP. As an example, any of the polishing pads 102 (i.e., polishing pad portions 800, 810, 820, 830, 840) described above with respect to FIGS. 8A-8E may be loaded with slurry 110 (i.e., the grooves and channels of the polishing pads may be filled with slurry 110) to prevent or limit the development of slurry active ingredient concentration gradients during CMP. Further examples of polishing pads 102 configured with slurry reservoirs for improved CMP are described below with respect to FIGS. 9 and 10A,B.

Figure 9:
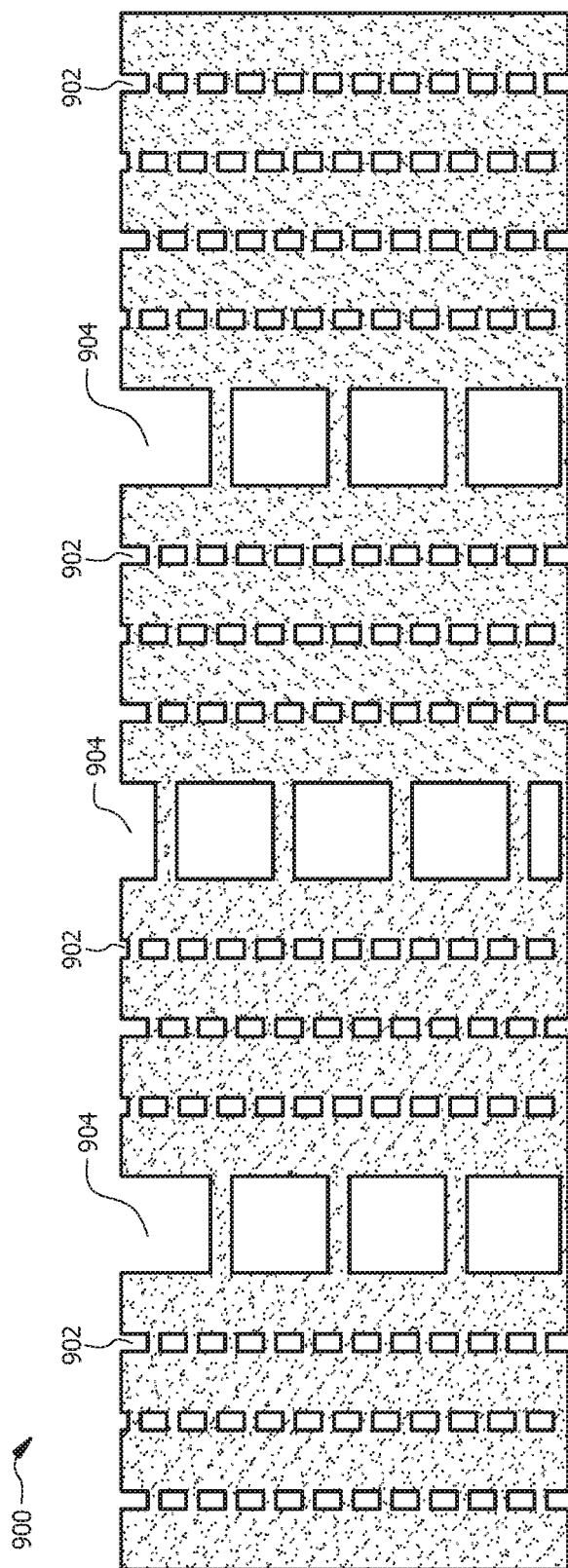
FIG. 9 is a diagram illustrating an example polishing pad with relatively large buried grooves configured to act as slurry reservoirs.

FIG. 9 illustrates a polishing pad portion 900 (i.e., a portion 900 of an example polishing pad 102) which includes both relatively small grooves 902 and larger slurry grooves 904 which may act as slurry reservoirs. The smaller grooves 902 may enhance local slurry 110 distribution during CMP. The larger grooves 904 may facilitate rapid distribution of slurry 110 along the entire surface (e.g., globally rather than locally) of the wafer 106. The combination of both small grooves 902 and relatively large slurry reservoirs 904 may reduce the concentration gradient of active slurry 110 near the wafer surface, thereby resulting in improved CMP. The grooves 904 may be similarly sized to those illustrated in FIG. 7A (described above) or may be larger (e.g., one and a half times, or more, of the size of grooves 702a-d of polishing pad 700 illustrated in FIG. 7A). The larger reservoir grooves 904 may provide a path for slurry byproducts to be carried away from the surface of the polishing pad 900. This may help maintain a desirable slurry 110 distribution at the surface of the polishing pad 900 where CMP occurs. For example, the small grooves 902 may have a hexagonal pattern or any other appropriate pattern. While the example of FIG. 9 illustrates small grooves 902 parallel to the large grooves 904, other designs are contemplated (e.g., with small grooves 902 perpendicular to the large grooves 904). The exemplary design of FIG. 9 is just one example of many related designs (i.e., with both small grooves 902 and larger grooves 904) contemplated by this disclosure.

Figure 10A:
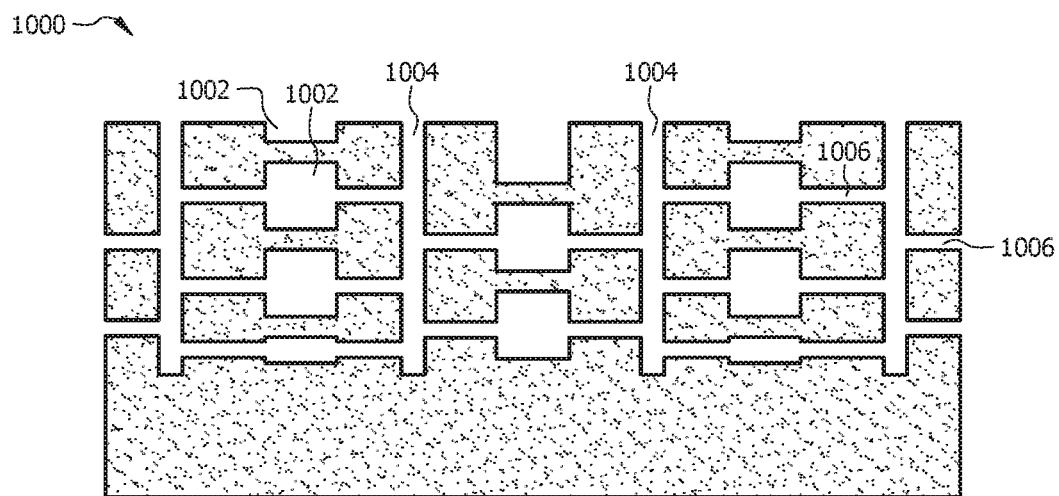
FIGS. 10A and 10B are diagrams illustrating example polishing pads with channels vertically connecting buried grooves in order to provide slurry reservoirs.
Figure 10B:
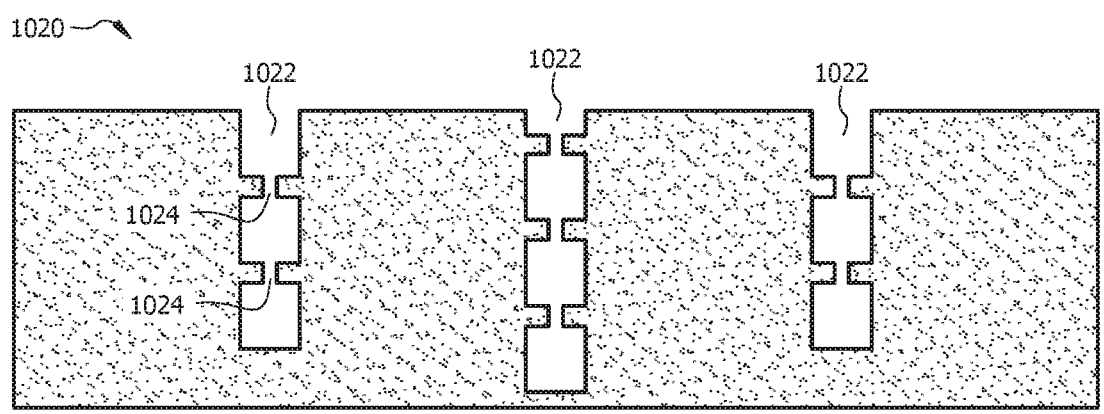

FIG. 10A illustrates an example polishing pad portion 1000 (i.e., a portion 1000 of an example polishing pad 102) with horizontal channels 1006 connecting buried grooves 1002 to vertical channels 1004. The channels 1004, 1006 generally facilitate the flow of slurry 110 into the grooves 1002. Once buried grooves 1002 are filled with slurry 110, the polishing pad 1000 may be less compressible, and the resulting slurry-filled polishing pad 1000 is "stiffer," resulting in improved planarization efficiency compared to that of a conventional polishing pad. FIG. 10B illustrates another polishing pad portion 1020 (i.e., a portion 1020 of an example polishing pad 102) which includes grooves 1022 which are fluidically connected vertically via channels 1024. The example polishing pads 1000, 1020 illustrated in FIGS. 10A and 10B generally provide an increased volume for holding slurry 110. In some embodiments, the channels 1004, 1006, 1024 may be narrow to prevent or reduce dilution of slurry 110 within the channels 1004, 1006, 1024 when the pad 1000 is rinsed (e.g., as may occur during certain CMP processes). Pad rinsing may also or alternatively be modified to limit the extent of slurry 110 dilution within the channels 1004, 1006, 1024, for example, by: (i) eliminating rinsing steps from the CMP process, (ii) reducing pad rinse times, (iii) performing rinsing steps at high rotational speeds (e.g., of the platen 104 of FIG. 1) such that the rinse fluid (e.g., solvent, water, or the like) is removed from the surface rapidly, or any combination of these and any other appropriate approaches.

Methods of preparing Polishing Pads

FIG. 11 illustrates an example process 1100 for preparing a CMP pad 102 according to an illustrative embodiment of the present disclosure. In this example, a plurality of thin layers of pad material are progressively formed using a vat-based additive manufacturing process. Each layer of the plurality of layers may be formed via UV-initiated reaction of a precursor material to form a thin layer of solidified pad material. The resulting pad 102 is thus formed with a precisely controlled structure (e.g., to achieve the compressibility and density properties described above) by projecting an appropriate pattern of light (e.g., UV irradiation) for forming each thin layer. Using process 1100, polishing pads 102 can be formed with more tightly controlled physical and chemical properties than is possible using conventional processes. For example, using process 1100, CMP pads 102 can be prepared with the unique groove and channel structures described above with respect to FIGS. 5A-10B. Process 1100 also facilitates increased manufacturing throughput than is possible using conventional methods, including extrusion-based printing processes (e.g., processes involving a mechanical printhead with nozzles that eject precursor material onto a surface as the printhead is moved).

As shown in FIG. 11, at step 1102, one or more precursors, a porogen, and/or any additives are added to a vat or reservoir of an additive manufacturing apparatus. The precursor is generally a liquid and may be or include a polyurethane or polyacrylate resin. For example, the precursors may include one or more flexible polyurethanes, rigid polyurethanes, elastomeric polyurethanes and urethane methacrylates. Without limitation, examples of suitable resins for the precursor include EPU40, EPU41, RPU60, RPU61, RPU70, UMA90 and FPU50 (available commercially from Carbon 3d, Redwood City, CA). In some embodiments, a precursor may include two or more components. For example, an example resin may include a first component (e.g., an A component) and a second component (a "B" component). A manufacturer of the resin may provide recommendations for preparing the resin via combination of a predetermined ratio of the first and second components of the resin. In some embodiments, the precursors may include only one component of a given resin. For example, the a "dual-cure" resin may include an A component and a B component, which may be mixed a manufacturer-specified ratio. This disclosure recognizes that the exclusion of one component of a dual-cure resin may provide improved properties (e.g., in terms of removal rate during polishing) to the resulting polishing pad 102 (see TABLE 2 and corresponding description below).

To adjust the properties of the polishing pad, the polyurethane resin may be combined with one or more additives. Suitable additives include, but are not limited to, urethane monomers, urethane oligomers, amines polyurethane with desired mechanical properties for the polishing pad 102. The polyurethane resin precursor may include a photoinitiator for initiating this polymerization reaction in regions exposed to light (e.g., UV irradiation). The precursor mixture may include a crosslinking agent such as an isocyanate compound. Alternatively, a multi-functional oligomer (e.g. a multi-functional urethane acrylate oligomer) may be used to improve the crosslinking degree of the urethane segment.

As described above, in some embodiments, one or more porogens is included in the vat or reservoir in order to form pores in the polishing pad 102 (see FIG. 3 and corresponding description above). Example porogens are described above. The porogen is typically added at a weight percentage of between 1% to 30%. However, the porogen may be added at a lower or higher concentration as appropriate for a given application.

At step 1104 of example method 1100, a build platform of the additive manufacturing apparatus is lowered into a thin film of the precursor material until it is close to or touching the bottom of the precursor-filled vat. At step 1106, the build platform is moved upward to the desired height for the first layer of the pad 102. The height may be on the scale of about 5, 10, 15, 20, 25, 50, 100 or micrometers (or greater when appropriate). Overall, a thickness of each layer of the plurality of layers may be less than 50% of a total thickness of the polishing pad 102 or the polishing layer 202 of the pad 102. A thickness of each layer of the plurality of layers may be less than 1% of a total thickness of the polishing pad 102 or the polishing layer 202 of the pad 102. Moreover, as described above, an adhesive (e.g., a platen adhesive) may be placed on the build platform before the start of process 1100 so that the pad is prepared directly on this adhesive.

At step 1108, which may be performed simultaneously with step 1106, a light source is used to "write" the structure of the first layer of the pad. For example, UV light may pass through a window at the bottom of the vat that is substantially transparent to the UV light (i.e., sufficiently transparent to UV light such that the intensity of the UV light can initiate a photoinitiated reaction of the precursor). In an example case where the process 1100 employs continuous liquid interface production, UV light passes through a "dead zone" (i.e., the thin liquid film of uncured precursor between the window and the build platform where dissolved oxygen levels inhibit the free radical reaction) and is projected in a predetermined pattern (i.e., a "write" pattern) for achieving a desired structure for the layer (e.g., with an appropriately patterned structure, as described above). In general, the regions of the precursor that are exposed to the UV light (i.e., based on a "write" pattern) under appropriate reaction conditions are radically polymerized. Photo-radical polymerization occurs after exposure to the UV light. Photo-radical polymerization may proceed continuously as the build platform is raised. For example, photo-radical polymerization may occur after exposure to the UV light. Using process 1100, a CMP pad 102 can be produced with the buried grooves and/or channels, described above with respect to FIGS. 5A-10B. The patterns of grooves and channels may be controlled by the pattern of the UV light projected on each layer of precursor during step 1108. These patterns can be controlled by a computer aided design (CAD) program that is used to design the pattern of the projected UV light.

At step 1110, a determination (e.g., by a controller or processor of the apparatus) is made of whether a desired pad thickness has been achieved (e.g., that a desired number of layers of the precursor has been photo-radically polymerized). If the desired thickness is not reached, the process returns to step 1106 and the build platform is moved upward again to the desired height of the second layer, which may be the same as or different than the height of the first layer. As the build platform is moved upward, uncured precursor flows beneath the cured layer. In some embodiments, the process pauses to allow an appropriate volume of precursor to flow (e.g., determined by the diameter of the polishing pad 102 being manufactured and the viscosity of the precursor). Steps 1108 and 1110 are then repeated to write and cure the second layer of the polishing pad 102 which may include the same or a different structure (e.g., of grooves and/or channels) than the first layer. Steps 1106 through 1110 are repeated until a desired thickness of the polishing pad 102 or of a portion (e.g., the backing portion 204 or polishing portion 202) of the pad 102 is achieved.

Once the desired thickness is achieved, the process 1100 proceeds to step 1112. At step 1112, a determination is made (e.g., by an individual or by a processor of the additive manufacturing apparatus) of whether the entire polishing pad 102 is complete. For example, in the preceding steps, only the backing portion 204 of the pad 102 may have been prepared (see FIGS. 2A-2C for reference). In such a case, it is determined that the final portion of the pad 102 is not complete (i.e., because the polishing portion 202 still needs to be prepared). If the final portion of the pad 102 is complete, the process 1100 proceeds to step 1118 (described below). However, if the final portion of the pad is not complete, the process 1100 proceeds to step 1114.

At step 1114, a determination is made of whether the next portion of the pad 102 (e.g., the polishing portion 202) should be prepared in the same vat or in a different vat. For example, if the polishing portion 202 is to be prepared using the same mixture of precursor(s), porogen(s), and/or additive(s) that was introduced at step 1102, then the polishing portion 202 is to be prepared in the same vat. If the next portion of the pad 102 is to be prepared in the same vat, the process 1100 may return to step 1102 such that the next portion (e.g., the polishing portion) of the pad 102 is prepared. However, if the next portion of the pad 102 is not to be prepared in the same vat, the process 1100 may proceed to step 1116 where the pad 102 is moved to a second reservoir or vat. For example, the pad 102 (or the portion prepared at this stage of the process 1100) may be removed from the vat of the first additive manufacturing apparatus and moved to the vat of a second additive manufacturing apparatus. The vat of the second additive manufacturing apparatus may be filled with the appropriate combination of precursor(s), porogen(s), and/or additive(s) for achieving desired properties of the next portion (e.g., the polishing portion 202) of the pad 102. The process 1100 may then repeat from step 1104 to prepare the next portion (e.g., the polishing portion 202) of the pad 102.

Once the desired pad thickness is achieved (step 1110) and the final pad portion is complete (step 1112), the process proceeds to step 1118. At step 1118, the pad 102 is removed from the build platform and, optionally, cured (e.g., at an increased temperature). In some embodiments, the pad 102 is removed from the build platform and no further curing is performed.

At step 1120, the pad 102 may be rinsed to remove residual precursor, porogens, and/or additives. In some embodiments, the pad 102 is only rinsed with a mild solvent or water to prevent damage to the pad 102. In some embodiments, the pad 102 is not rinsed at step 1114. In some embodiments, portions of the CMP pad 102 may be backfilled with a second material (e.g., as illustrated in FIG. 8E). At step 1122, the CMP pad is used for chemical mechanical planarization. For example, the CMP pad 102 may be used in the system 100 described above with respect to FIG. 1.

In general, the width of the polishing pads 102 described herein is not limited to the size of the reservoir or vat used for their preparation. During production, precursor must be continuously replenished in the region beneath the pad that is being prepared. Polishing pads are typically 20-30 inches in diameter and sometimes only about $1/16^{th}$ of an inch thick, and more time is required to replenish the dead zone for a large-diameter polishing pad. One embodiment of the process described herein provides a solution to this problem by facilitating the production of the polishing pad in a fluted, or folded, manner. In this embodiment, the pad is constructed such that it resembles a fluted filter paper (i.e., a circular piece of paper folded in an accordion-like fashion). Thus, the polishing pad can be manufactured in a conical shape with folded sides, such that, while the constructed pad remains pliable enough to be manipulated (e.g., before it is fully cured), the conical structure can be unfolded to achieve the desired circular or disk-like shape of the polishing pad.

Figure 12A:
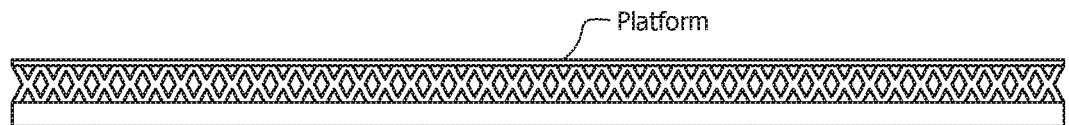
FIGS. 12A and 12B are diagrams illustrating two different orientations for preparing polishing pads using continuous liquid interface production.
Figure 12B:
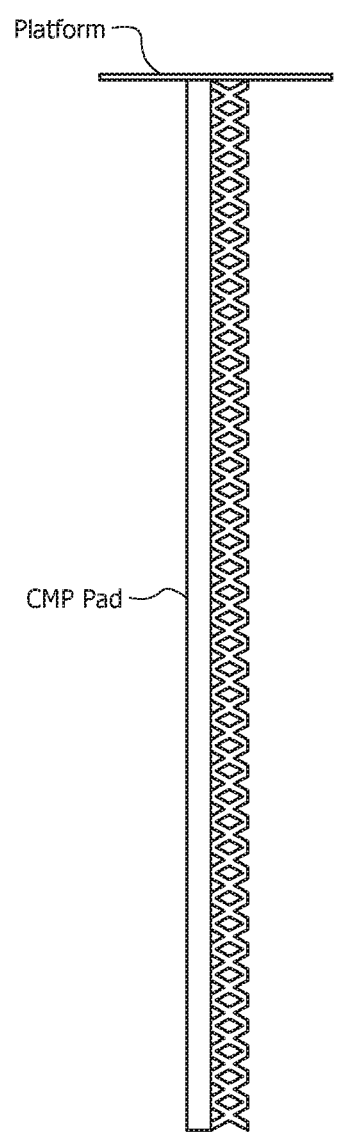

FIG. 12A illustrates the continuous liquid interface production described above in which the pad 102 is prepared on the build platform in a horizontal configuration. Pad 102 preparation in this horizontal orientation may be referred to as a horizontal process. In yet another embodiment of the invention, the polishing pads 102 are produced in a vertical orientation with respect to the build platform (i.e., using a vertical process), as illustrated in FIG. 12B. In this embodiment, replenishment of uncured precursor resin may be controlled more readily such that less time is required to replenish the uncured precursor resin than is required for a horizontal process. Tests indicate that similar performance (e.g., in terms of removal rate during planarization) can be achieved using pads prepared in both the horizontal configuration of FIG. 12A and the vertical configuration of FIG. 12B.

Using process 1100, in either a horizontal or vertical process, a polishing pad 102 can be produced with complex patterned structures that are determined by the pattern of the UV light projected on each layer of precursor. These patterns can be controlled by a computer aided design (CAD) program that is used to design the pattern of the projected UV light. An advantage of this approach is that the build volume (i.e., the volume of the produced polishing pad layer) can be much larger than the volume of the vat itself, and only enough precursor is required at a given time to maintain a thin film in the vat. In addition to the pattern of the UV irradiation, other parameters can be changed to achieve desired properties of the cured material including: the intensity of the UV irradiation, the temperature of the vat, and the properties of the precursor (e.g., via the addition of porogen and/or additives).

The disclosure eliminates the need for making expensive and time-consuming molds, as needed in molding or casting processes. In certain embodiments, the steps of molding, casting, and machining may be eliminated. Additionally, tight tolerances can be achieved due to the layer-by layer manufacturing approach described herein. Also, one system can be used to manufacture a variety of different polishing pads, simply by changing the UV "write" pattern stored in a CAD program. While certain examples herein describe the use of continuous liquid interface production as a vat-based additive manufacturing approach, it should be understood that any appropriate vat-based manufacturing approach may be employed to prepare the CMP pads 102 described in this disclosure.

Experimental Examples

Effect of Porogen Amount and Extent of Crosslinking

A series of pads were prepared using the same resin combined with different amounts of a porogen and with different extents of crosslinking. Different extents of crosslinking were achieved by either adding or not adding a cross-linking agent (e.g., an isocyanate crosslinker). Highly crosslinked resin was prepared with the cross-linking agent present. A relative removal rate was determined for each pad. The relative removal rate corresponds to the rate at which a silicon oxide layer is removed using the pad compared to the rate achieved using a commercially available CMP pad. TABLE 1 below shows that for the same resin (FPU50), the relative removal rate is increased when the amount of porogen is increased and the extent of crosslinking is increased. In TABLE 1, a low porogen amount corresponds to about 3 wt % porogen in the precursor mixture, and a high porogen amount corresponds to about 5 wt % of the porogen in the precursor mixture.

TABLE 1

Effect of extent of crosslinking and porogen amount on removal rate

| Resin | Porogen amount | Relative removal rate |
|---|---|---|
| FPU50 | Low | 64% |
| FPU50 | High | 74% |
| FPU50, Highly crosslinked | Low | 74% |
| FPU50, Highly crosslinked | High | 81% |

Effect of Omitting Component from Dual-Cure Resin

A series of pads were prepared using a dual-cure resin. For some pads, each component of the dual-cure resin was included in the precursor. For other pads, one component of the dual-cure resin was omitted from the precursor. TABLE 2 below shows the relative removal rates achieved by pads with different resins (or combinations of resins) with and without the dual cure component included in the precursor. As shown in TABLE 2, the removal rate increased when a dual cure component was omitted from the precursor. In particular, pads prepared without the dual cure component had an increased removal rate compared to that of the commercially available polishing pad used as a benchmark.

TABLE 2

Effect of omitting component of dual-cure resin on removal rate

| Resin | Relative removal rate |
|---|---|
| FPU50 (omit dual cure component) | 109% |
| FPU50 | 81% |
| FPU50/EPU40 80/20 (omit dual cure component) | 110% |
| FPU50/EPU40 60/40 | 80% |

Modifications, additions, or omissions may be made to the systems, apparatuses, and methods described herein. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set. Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better explain the disclosure and does not pose a limitation on the scope of claims.

What is claimed is:

1. A method of making a chemical mechanical polishing pad, the method comprising:
    providing a precursor to a first vat of a first additive manufacturing apparatus; and
    preparing at least a portion of the chemical mechanical polishing pad via a layer-by-layer process by exposing the precursor to patterned light, the prepared portion comprising a polymer material with a first elastic modulus, wherein:
    the prepared portion is a backing portion of the chemical mechanical polishing pad; and
    the method further comprises:
        removing the backing portion from the first vat;
        affixing the backing portion to a surface within a second vat of a second additive manufacturing apparatus;
        providing a second precursor to the second vat of the second additive manufacturing apparatus; and
    preparing a polishing portion of the chemical mechanical polishing pad by exposing the second precursor to patterned light, the prepared polishing portion comprising a polymer material with a second elastic modulus, wherein the first elastic modulus is less than the second elastic modulus.

2. The method of claim 1, wherein the precursor comprises a resin and one or both of a porogen and a crosslinking agent.

3. The method of claim 2, wherein the resin is one component of a multiple component dual cure resin.

4. The method of claim 2, wherein a concentration of the porogen is in a range from one to thirty percent by weight.

5. The method of claim 2, wherein the crosslinking agent is an isocyanate compound.

6. The method of claim 1, wherein the backing portion comprises at least one of a nonporous layer, a porous layer, or a lattice structure.

7. The method of claim 1, wherein the polishing portion comprises a polishing surface, the polishing surface comprising at least one of grooves, pores, or a microstructure.

8. The method of claim 1, wherein a density of the polishing portion is in a range from 0.3 to 0.9 grams per centimeter cubed.

* * * * *